US011812888B1

(12) United States Patent
Burrows

(10) Patent No.: US 11,812,888 B1
(45) Date of Patent: Nov. 14, 2023

(54) MAGNETICALLY DRIVEN BEVERAGE BREWING AND CLEANING SYSTEM

(71) Applicant: Havana Savannah, LLC, Valencia (CA)

(72) Inventor: Bruce D. Burrows, Valencia, CA (US)

(73) Assignee: Havana Savannah, LLC, Valencia, CA (US)

( * ) Notice: Subject to any disclaimer, the term of this patent is extended or adjusted under 35 U.S.C. 154(b) by 0 days.

(21) Appl. No.: 17/816,423

(22) Filed: Jul. 31, 2022

Related U.S. Application Data

(62) Division of application No. 17/662,735, filed on May 10, 2022, now Pat. No. 11,457,765.

(51) Int. Cl.
*A47J 31/40* (2006.01)
*A47J 31/20* (2006.01)
*A47J 31/44* (2006.01)
*A47J 31/42* (2006.01)
*A23F 5/26* (2006.01)
(Continued)

(52) U.S. Cl.
CPC ............. *A47J 31/20* (2013.01); *A23F 5/26* (2013.01); *A47J 31/06* (2013.01); *A47J 31/401* (2013.01); *A47J 31/42* (2013.01); *A47J 31/4403* (2013.01); *A47J 31/46* (2013.01); *A47J 31/60* (2013.01); *B08B 3/02* (2013.01); *B08B 3/102* (2013.01); *A47J 31/404* (2013.01)

(58) Field of Classification Search
CPC ........ A47J 31/40; A47J 31/401; A47J 31/404; A47J 31/42; A23F 5/24; A23F 5/243; A23F 5/246; A23F 5/26
See application file for complete search history.

(56) References Cited

U.S. PATENT DOCUMENTS 2,459,498 A  1/1949 Cameron
2,827,845 A  3/1958 Richeson
(Continued)

FOREIGN PATENT DOCUMENTS

CN  102727098  10/2012
CN  202698862  1/2013
(Continued)

OTHER PUBLICATIONS

Bunn Trifecta Automatic Single-Cup Brewer, Prima Coffee Equipment, [online], [site visited Jul. 9, 2021], 6 pages, Available from internet URL: https://prima-coffee.com/equipment/bunn/41200-0000 (Year: 2021).

(Continued)

*Primary Examiner* — Reginald Alexander
(74) *Attorney, Agent, or Firm* — Koffsky Schwalb LLC; Mark I. Koffsky

(57) ABSTRACT

A coffee brewing system includes a brew vessel adapted to receive water and ground coffee to produce and store a brewed beverage and to provide for a cleaning system. The brew vessel includes a filter and a magnet stirrer in the lower portion of the brew vessel. The magnet stirrer creates a water vortex for brewing the coffee. The used coffee grounds are allowed to settle on the filter creating a bed of used coffee grounds and the coffee is then filtered through both the bed of used coffee grounds and the filter and collected in a coffee storage container. A cleaning system is used to remove unsightly coffee stains and oil films in the system after a brewing cycle.

13 Claims, 33 Drawing Sheets

(51) Int. Cl.
- *A47J 31/46* (2006.01)
- *B08B 3/02* (2006.01)
- *A47J 31/06* (2006.01)
- *A47J 31/60* (2006.01)
- *B08B 3/10* (2006.01)

(56) References Cited

U.S. PATENT DOCUMENTS

| | | | |
|---|---|---|---|
| 2,927,522 A | 3/1960 | Rockwood | |
| 3,171,344 A | 3/1965 | Mathieu | |
| 3,696,733 A | 10/1972 | Beverett | |
| 4,880,535 A | 11/1989 | Burrows | |
| 4,967,647 A | 11/1990 | King | |
| 5,083,502 A * | 1/1992 | Enomoto | A47J 31/42 99/287 |
| 5,349,897 A | 9/1994 | King | |
| 5,351,604 A | 10/1994 | King | |
| 5,479,849 A | 1/1996 | King | |
| 5,551,331 A | 9/1996 | Pfeifer | |
| D382,762 S | 8/1997 | Felip | |
| 5,697,288 A | 12/1997 | King | |
| 5,939,540 A | 8/1999 | Reed | |
| 6,240,833 B1 | 6/2001 | Sham | |
| 6,968,775 B2 | 11/2005 | Burrows | |
| 6,988,444 B1 | 1/2006 | Pfeifer | |
| 7,040,218 B1 | 5/2006 | Biolchini, Jr. | |
| 7,240,611 B2 | 7/2007 | Burrows | |
| 7,340,991 B2 | 3/2008 | Burrows | |
| 7,946,752 B2 | 5/2011 | Swartz | |
| D696,891 S | 1/2014 | Burrows | |
| D696,903 S | 1/2014 | Burrows | |
| D734,972 S | 7/2015 | Burrows | |
| D735,516 S | 8/2015 | Burrows | |
| D735,517 S | 8/2015 | Burrows | |
| 9,155,420 B2 | 10/2015 | Quinn | |
| D742,680 S | 11/2015 | Burrows | |
| 9,307,860 B2 | 4/2016 | Burrows | |
| D756,697 S | 5/2016 | Burrows | |
| D767,331 S | 9/2016 | Burrows | |
| D771,434 S | 11/2016 | Burrows | |
| 9,480,279 B2 | 11/2016 | Fogelin | |
| D792,146 S | 7/2017 | Burrows | |
| 9,968,218 B2 | 5/2018 | Burrows | |
| 10,045,654 B2 | 8/2018 | Burrows | |
| D828,065 S | 9/2018 | Burrows | |
| 10,653,266 B1 | 5/2020 | Brown | |
| 10,716,430 B2 | 7/2020 | Burrows | |
| 10,874,246 B2 | 12/2020 | Burrows | |
| 10,881,241 B2 | 1/2021 | Burrows | |
| 11,000,145 B2 | 5/2021 | Ballezzi | |
| D934,017 S | 10/2021 | Burrows | |
| 11,457,765 B1 | 10/2022 | Burrows | |
| 2004/0231522 A1 | 11/2004 | Burrows | |
| 2005/0008744 A1 | 1/2005 | Mazzola | |
| 2005/0238341 A1 | 10/2005 | Thaler | |
| 2006/0090653 A1 | 5/2006 | McDuffie | |
| 2009/0095165 A1 | 4/2009 | Nosler | |
| 2010/0154645 A1 | 6/2010 | Nosler | |
| 2010/0203209 A1 | 8/2010 | Fishbein | |
| 2010/0270587 A1 | 10/2010 | Rahimo | |
| 2010/0294135 A1 | 11/2010 | Weissman | |
| 2012/0199008 A1 | 8/2012 | White | |
| 2013/0276637 A1 | 10/2013 | Stordy | |
| 2015/0150405 A1 | 6/2015 | Burrows | |
| 2015/0157168 A1 | 6/2015 | Burrows | |
| 2015/0282662 A1 | 10/2015 | Harvey | |
| 2015/0327718 A1 | 11/2015 | Burrows | |
| 2016/0095463 A1 | 4/2016 | Mazzer | |
| 2016/0174755 A1 | 6/2016 | Burrows | |
| 2016/0184830 A1 * | 6/2016 | Misumi | A47J 31/42 241/261.2 |
| 2016/0270587 A1 | 9/2016 | Yu | |
| 2016/0338527 A1 | 11/2016 | Burrows | |
| 2016/0353919 A1 | 12/2016 | Burrows | |
| 2016/0360919 A1 | 12/2016 | Burrows | |
| 2017/0027367 A1 | 2/2017 | Burrows | |
| 2017/0055760 A1 | 3/2017 | Burrows | |
| 2017/0119195 A1 | 5/2017 | Al-Shaibani | |
| 2017/0119201 A1 | 5/2017 | Walker | |
| 2017/0172338 A1 | 6/2017 | Burrows | |
| 2017/0273496 A1 * | 9/2017 | Kitatani | A47J 31/18 |
| 2017/0295989 A1 | 10/2017 | Burrows | |
| 2017/0295992 A1 | 10/2017 | Mangold | |
| 2018/0008088 A1 * | 1/2018 | Alshammary | A47J 31/405 |
| 2018/0140130 A1 | 5/2018 | Zhou | |
| 2019/0038066 A1 | 2/2019 | Kihara | |
| 2019/0191915 A1 * | 6/2019 | Ren | A47J 31/46 |
| 2020/0060463 A1 | 2/2020 | Gardiner | |
| 2020/0093315 A1 | 3/2020 | Burrows | |
| 2020/0345171 A1 | 11/2020 | Burrows | |
| 2021/0000283 A1 | 1/2021 | Burrows | |
| 2021/0274973 A1 | 9/2021 | Ceotto | |
| 2021/0315411 A1 | 10/2021 | Burrows | |
| 2022/0354296 A1 | 11/2022 | Burrows | |
| 2023/0018674 A1 * | 1/2023 | Hawkins | A47J 43/046 |

FOREIGN PATENT DOCUMENTS

| | | |
|---|---|---|
| EP | 1787523 | 5/2007 |
| GB | 2268392 | 1/1994 |
| WO | 2008044948 | 4/2008 |
| WO | 2015038809 | 3/2015 |
| WO | 2017075414 | 5/2017 |
| WO | 2019217602 A2 | 11/2019 |

OTHER PUBLICATIONS

EPO SSR for EP19865425 (May 12, 2022) (12 pages).
IPRP for PCT/US2019/052954 (Mar. 23, 2021) (5 pages).
ISR for PCT/US2019/052954 (Dec. 30, 2019) (3 pages).
Translation for CN202698862 published Jan. 2013, 16 pages.
Notice of Allowance dated Aug. 26, 2022 for U.S. Appl. No. 17/662,735 (pp. 1-8).
Notice of Allowance dated Oct. 11, 2022 for U.S. Appl. No. 17/814,231 (pp. 1-9).
Office Action dated Sep. 14, 2022 for U.S. Appl. No. 17/814,231 (pp. 1-14).

* cited by examiner

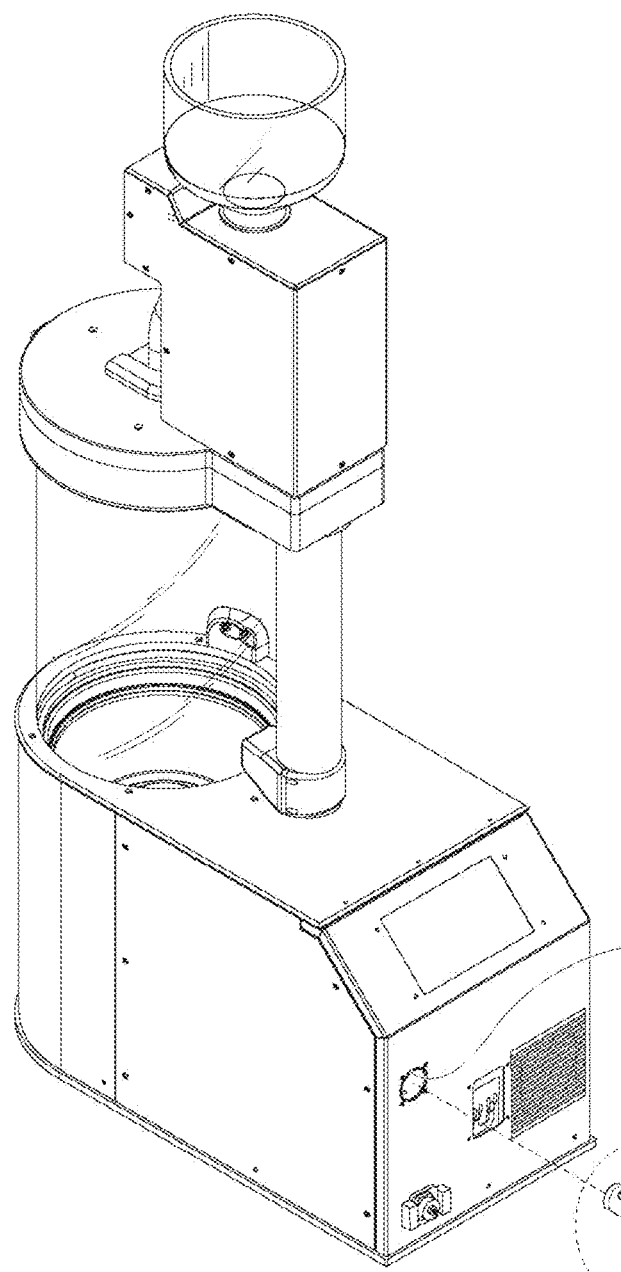
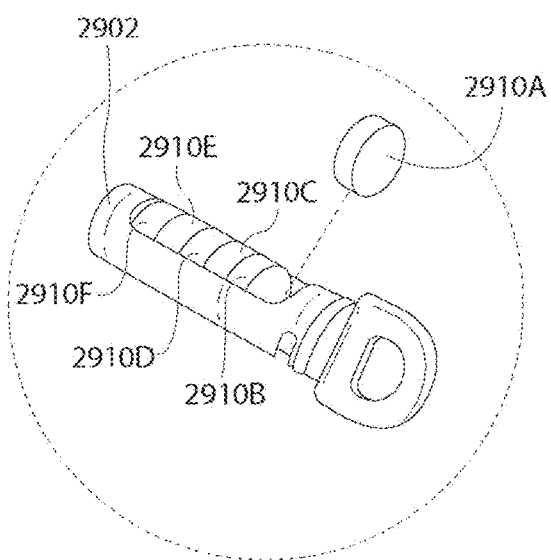
Fig. 29B
Fig. 29A

MAGNETICALLY DRIVEN BEVERAGE BREWING AND CLEANING SYSTEM

TECHNICAL FIELD

The present disclosure generally relate to systems and methods for brewing a beverage. More particularly, the present disclosure relates to systems and methods for brewing high quality hot coffee and cold brew coffee in a rapid and convenient manner, and for providing a cleaning mechanism thereto.

BACKGROUND

Coffee is a very popular drink that is consumed by a huge number of consumers every day. Typically consumers rely on coffee shops, restaurants, and other places that produce brewed coffee in bulk for consumer consumption. In making large quantities of coffee, typical coffee brewing machines are used that pass heated water through a static bed of coffee grounds to produce a coffee beverage that is collected in a coffee container. This is referred to as a drip coffee maker. The static bed of coffee grounds, which grounds are produced by grinding roasted coffee beans, is typically contained within a disposable paper filter held within a funnel.

Drip-style coffee brewers are available in a wide range of different configurations and sizes for use in residential or commercial environments to produce brewed coffee. Such coffee brewers commonly include a water reservoir from which a controlled volume of water is heated and then dispensed downwardly by dripping or spraying onto coffee grounds contained within an underlying, upwardly open brew basket. The hot water intermixes with the coffee grounds to produce the desired brewed coffee beverage which is drained from the brew basket through a filter element into an underlying coffee pot such as a carafe or decanter. In one common form, the brewer includes a refillable water reservoir from which the water is delivered through a heating element for drip-flow dispensing into the brew basket. Alternately, the brewer may be coupled directly to a tap water supply or the like.

While drip-style coffee brewers of the above described type have been used extensively for many years, the flavor and other characteristics of the brewed coffee is inconsistent and, in many cases, can be of marginal or unacceptable quality. Such problems are believed to stem from inadequate and/or inconsistent intermixing of the hot water with the coffee grounds contained in the brew basket, resulting in brewed coffee exhibiting inconsistent flavor and body traits, often including unacceptable bitter taste attributes. In this regard, the downward dispensing of hot water onto the initially dry coffee grounds in the underlying brew basket can produce erosion-type channels through the coffee grounds, wherein such channels can permit a significant portion of the water volume to pass through the coffee grounds and drip from the brew basket without significantly wetting or otherwise adequately intermixing therewith. While this channeling problem can sometimes be mitigated by carefully pre-distributing the coffee grounds substantially uniformly within the brew basket, significant attention to this aspect of the coffee brewing process is seldom given.

A variety of modified coffee brewers and related brewing processes have been provided in an attempt to overcome these problems and disadvantages by providing improved intermixing between the heated water and the coffee grounds within a filtered brew basket. In general, such concepts utilize mechanical stirring devices for improving thorough contact between the heated water and the coffee grounds. While such concepts may provide brewed coffee with enhanced and/or more consistent flavor characteristics, they inherently incorporate moving parts that increase the overall complexity and cost of the coffee brewer, and are susceptible to occasional break-down to require periodic repair or replacement.

There exists, therefore, a continuing need for further improvements in and to coffee brewers and related coffee brewing processes for achieving significantly improved intermixing between heated water and coffee grounds, for providing brewed coffee of consistent high quality and improved flavor and other desirable attributes, The present invention fulfills these needs and provides further related advantages.

A static bed of coffee grounds presents numerous problems that negatively affect the coffee made with known brewing machines according to traditional brewing methods. It is difficult to maintain the temperature of the heated water evenly while the heated water passes through a static bed of coffee grounds. The heated water that is introduced at the top of the coffee grounds is hotter than the water and dissolved coffee passing through the bottom of the coffee grounds. That is, as the hot water dripped onto the top of the static bed descends through the bed of grounds it loses heat, and the water is substantially reduced in temperature as it reaches the bottom regions of the static bed of coffee grounds. The temperature drop of the water temperature passing through the static coffee grounds bed creates a temperature gradient that can negatively affect the quality of brewed coffee produced. Among other things, the traditional drip coffee can become bitter and acidic.

Additionally, water channels result from water passing through the static bed of coffee grounds. Water channels cause the water to pass through substantially the same parts of the coffee grounds static bed. In addition, exposing the same coffee grounds in the channel causes the water to extract more of the unpleasant chemicals from the coffee grounds and produce undesirable coffee. Further, a portion of the desirable flavor components contained in the remaining coffee grounds not in the channels are not sufficiently extracted, which results in effectively wasting coffee beans and flavor.

In addition, used coffee grounds are only usable to produce a certain amount of coffee until the coffee produced becomes undesirable in taste. When the coffee brewing cycle is completed, the used coffee grounds and soggy filters within these filter trays/funnels need to be physically removed. The heavy filter tray needs to be constantly lifted by a worker, taken out, cleaned, and refilled with new filters and coffee grounds. These filter trays with filters are generally positioned near the top of typical coffee brewers to allow gravity to pass water through the grounds and enable dispensing of coffee at a convenient height for workers in a coffee shop. However, having to constantly reach up to the top of these brewing machines to lift, remove and refill filter trays and filters can be a work safety issue for workers.

To address the deficiencies associated with the water flowing through a static bed of ground coffee, the patent application to Mazzola, U.S. Patent No. 2005/0008744, discloses a drip type coffee machine that uses a rotating paddle to stir the coffee grounds as the hot water is introduced to coffee grounds. However, the flavor of the coffee that is first created by the flowing of the water through the coffee grounds and then the filter would be stronger than the coffee later created by the flowing of the water through the coffee grounds.

In the patent to King, U.S. Pat. No. 5,349,897, a coffee maker for making a single cup of coffee is disclosed in which there is an upper brew vessel and a lower coffee receiving receptacle. A mesh filter is located between the upper brew vessel and the lower coffee receiving receptacle. Ground coffee is inserted into the upper brew vessel and a stream of air is pushed up into the brew vessel by a piston that mixes the coffee grounds and water in the upper chamber during the brewing. After brewing the single cup of coffee, the piston reverses direction and the piston sucks the coffee that is in the upper chamber through the filter into the lower coffee receiving receptacle where it is then dispensed.

In the patent application to Fishbein, U.S. Patent No. 2010/0203209, the coffee maker has a brew vessel having a spinning blade or magnetically coupled stirrer in the brew vessel for mixing the water and coffee grounds. The entire contents of the brew vessel is then pumped through filters which separate the used coffee grounds from the coffee and the coffee is then stored in a coffee container.

In the patent to Mathieu, U.S. Pat. No. 3,171,344, a coffee maker for use as a coffee vending machine having automatic cleaning is disclosed. The coffee grounds and water are mixed in a brew vessel B. The entire contents of the brew vessel is then deposited into a filter chamber F which includes a conical filter. A rapidly rotating agitator 58 stirs the fluidized slurry. The coffee is separated from the fluidized slurry by the filter F and is collected in a receptacle. Water is then sprayed into the filter chamber F to wash the filter and brew vessel and the used coffee grounds are then ejected from the bottom of the brew vessel into either the sewer system or into a collection chamber.

Cold brew coffee does not brew coffee with water that is at a temperature typically used to make hot coffee. Instead, the ground coffee is mixed with water that is at a much lower temperature, closer to room temperature. The ground coffee and the water mixture are held together, typically for 12 to 24 hours. The cold brew coffee is then filtered from the used coffee grounds and chilled, either by insertion into the refrigerator or by adding ice. Due to the long brewing cycle a retail establishment would have to store large amounts of cold brew coffee to meet customer needs. Accordingly, retailers typically use concentrated cold brew and mix it with cold water and ice. The concentrate is not fresh and would typically contain chemical preservatives.

In patent application to Yu, 2016/0270587, a cold brew coffee making machine is disclosed in which ground coffee and water are mixed by a spinning blade to create turbulence in the brew vessel. Yu further discloses the removal of the used coffee grounds by a separate filter.

The Cuisinart cold brew maker (See www.cuisinart.com) spins coffee grounds and water in a spinning basket, which is made of a filter material, to make cold brew in a home unit. The spinning of the separate basket causes the ground coffee beans to be forced against the side of the basket, by centrifugal force. The cycle time for making the cold brew is between approximately 30-45 minutes, depending on the strength of the cold brew coffee desired.

It is important in industrial situations to make sure that the coffee brewing chamber for brewing coffee is clean and in the case of a transparent coffee brewing chamber that it appears to be clean, without coffee stain oils build up on the sides of the coffee brewing chamber.

When the coffee is brewing in the coffee brewing chamber it is not easy to access the inside of the coffee brewing chamber to remove the coffee oil build up. Typically, the coffee build up would have to be removed when the coffee was no longer brewing, leaving the unsightly ring of coffee oil around the inside of the coffee brewing chamber.

The ring is also formed by evaporation of the hot coffee being brewed in the coffee brewing chamber even during the activity of the tornado. This may cause a ring to form on the inside of the coffee brewing chamber.

Once the coffee brewing procedure was completed, the coffee making machine would have to be opened to access the inside of the coffee brewing chamber to clean the oil ring on the inside of the coffee brewing chamber. This is time consuming and also, since the oil ring would have dried out as the coffee was being removed from the coffee brewing chamber, requiring scraping of the oil ring to remove it, most likely involving soap being applied on a scraping member, such as a sponge to remove the oil ring, Merely spraying hot water on the dried ring would not necessarily remove the dried ring from the inside of the coffee brewing chamber.

In systems in which coffee is ground and deposited into a brewing chamber made of glass or plastic the ground coffee, because of static electricity, the ground coffee attaches to the internal side walls of the brewing chamber before entering the water contained in the bottom in the coffee brewing chamber. This will prevent the coffee grounds from mixing with the water, wasting the coffee grounds and preventing the uniform brewing of the coffee since the amount of coffee reaching the water for brewing is not uniform. Additionally, in the case of a transparent brewing chamber the presence of ground coffee beans on the side walls is unattractive. Further, the attachment of the coffee grounds to the internal side walls of the coffee brewing chamber will interfere with subsequent operation of the coffee machine, interferes with cleaning of the coffee machine, and possibly become a source of contamination.

SUMMARY OF THE PRESENT INVENTION

A summary of various aspects of the present invention follows. This specification uses the following defined terms: "Coffee beans" are roasted coffee beans; "coffee grounds" are roasted coffee beans that are ground, either by the coffee grinder of the present invention, or by a separate coffee grinder; "fluidized slurry" is the mixture of the coffee grounds and water during brewing, either hot or cold; "used coffee grounds" are the grounds that are in the fluidized slurry during and after brewing; "coffee" is the fluid that is obtained after the filtering of the fluidized slurry. The coffee may or may not contain sediment; and "sediment" is particles of the used coffee grounds that pass through the filter.

In the preferred embodiment of the present invention, a brew vessel receives water and coffee grounds to produce a brewed beverage. A portion of the walls of the brew vessel are made of a transparent material, such as heat resistant glass, so that the brewing operation of the coffee is visible. The brew vessel includes a reusable filter, preferably conical, disposed in a lower portion of the brew vessel that is used to filter the coffee from the mixture of coffee grounds and water (fluidized slurry). A magnet stirrer in the lower portion of the brew vessel, coupled to a motor below the magnet stirrer, creates a water vortex for mixing the ground coffee and water and at around the same time preventing the small particles of the used coffee grounds from clogging the pores of the filter.

Once the magnet stirrer is stopped, the used coffee grounds in the fluidized slurry settle to a lower portion of the brew vessel, covering at least a portion, if not all, of the filter and a bottom butterfly valve. After the used coffee grounds have substantially settled, the coffee is then withdrawn from the brew vessel and stored in a separate coffee container, such as a thermos.

The brew vessel is connected to a grounds outlet chute at a bottom portion of the brew vessel adapted to remove the used coffee grounds after the coffee is withdrawn from the brew vessel. A butterfly valve having closed and open positions covers an outlet chute to allow used coffee grounds to enter the outlet chute and then to a drain or a used coffee grounds collector. The butterfly valve is controlled by a motor.

There is a significant heat loss to the water in the brew vessel through the glass wall of the brew vessel, and also once the ground coffee is introduced into the water in the brew vessel. To replace the lost heat, the base includes a water circulation heat exchange system for replacing the heat lost.

The present invention may also be used to make cold brew coffee. Typically, in making cold brew coffee, the temperature of the water is less than that of the water used for hot coffee.

A home version of the present invention is also disclosed in which both hot coffee and cold brew coffee can be made. In the preferred embodiment, the home version would not have an automatic cleaning system, but would have removable components for cleaning. The operation of the home version would otherwise be essentially the same as the industrial version.

The oils and coffee solids are mixed in the coffee solution. The water in the coffee evaporates as it swirls around at the air/liquid interface to form a more viscous oil/coffee mixture that more adheres to the glass. By periodically raising and lowering the tornado speed (and subsequent raising and lowering of the outer margins of the tornado, the coffee keeps wetted and limited evaporation ensues, which therefore minimizes the coffee solids/oils from sticking to the glass.

Upon activation of the stirring magnetic member, the water in the coffee brewing chamber is agitated by the stirring magnetic member at the bottom of the coffee brewing chamber. The stirrer is in magnetic coupling to a motor that has a magnetic element essentially parallel to the magnetic stirrer so that spinning of the motor causes the parallel magnetic member to spin, which in turn causes the magnetic coffee stirring member to spin.

The coffee stirring member is at such a speed to create a tornado effect in the brewing coffee. Since there is centrifugal force created by the spinning water, the coffee being brewed in contact with the side wall of the coffee brewing chamber will rise above the resting level of the coffee being brewed in the middle of the coffee brewing chamber. When the stirrer is turned off the level of the coffee being brewed will be lower and will, if no action is taken, form a ring of coffee oil on the inside wall of the coffee brewing member.

The stirring member herein may be started and stopped between brewing and cleaning cycles (or between repeated brewing cycles or between repeated cleaning cycles) using different methodologies or patterns. For example, the stirring may start and stop entirely. Or the stirring may slow down rather than the stirring stopping entirely. Or the stirring may slow down or speed up based on a modulation scheme or pattern, including pulse-width modulation and the like.

In cleaning mode, activating the stirring magnetic member will cause the level of the coffee being brewed to rise again, cleaning the oil ring that might form. The speed of the magnetic stirring member is sufficient to raise the water level by, for example about ½-1 inch. The height of the increase of the water level is determined by the speed of the stirring magnet and the diameter of the coffee brewing chamber.

Cleaning of the inside of the coffee brewing chamber may be assisted by the spraying of water from a water head proximate the upper portion of the coffee brewing chamber so as to spray water on the portion of the inside coffee brewing chamber including an area proximate to the ring of coffee.

The up-and-down action of the vortex containing the coffee or cleaning solution caused by the increasing and decreasing the speed of the magnetic stirrer and/or the spraying of water on the inside wall of the coffee brewing chamber. This strives to keep clean the surface of the inside of the coffee brewing chamber that is in contact with the brewing coffee. During the brewing cycle, periodic spritzes of hot water emerge from the nozzles installed within the top of the brewing chamber and this removes the fogging of the glass and any residual oils and fine coffee products that adhered to the glass.

The additional water from this "spritzing" is considered when determining the water and coffee for brewing. The "spritzing" may be done radially so that no pump is needed to elevate the pressure of the spritzing water. It may completely cover the inside of the glass at the right velocity to produce a sheet of water to clean the glass. If this spritzing is done straight down, a pump may be needed.

In an embodiment of the present invention a hollow tubular member has a channel to a source of air blown by a fan into the top opening of the hollow tubular member and a separate upwardly angled side channel proximate the top opening of the hollow tubular member for receiving ground coffee that is ground in a conventional coffee grinder. The ground coffee flows through the hollow tubular member and exits from the bottom opening of the hollow tubular member directly into the brewing chamber. Air blown by the fan increases the velocity of the ground coffee in the hollow tubular member downward into the water in the brewing chamber and minimizes the ground coffee from attaching to the side walls of the brewing chamber. The air flow also minimizes the ground coffee from sticking to the interior side walls of the hollow tubular member, minimizes clogging of the hollow tubular member, and minimizes potential buildup of previously-ground grounds in the hollow tubular member.

The above summary has outlined, rather broadly, some features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization of components and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

OBJECTS OF THE PRESENT INVENTION

It is an object of the present invention to a make smoother coffee.

It is another object of the present invention to more effectively extract the flavor of ground coffee.

It is still another object of the present invention to make more consistent brewed coffee.

It is yet another object of the present invention to more efficiently use the coffee grounds.

It is another object of the present invention to make cold brew coffee in less time.

It is also another object of the present invention to provide a coffee machine that can make both hot coffee and cold brew coffee.

It is an object of the present invention to prevent the oil ring from forming;

It is another object of the present invention to prevent the coffee ring from having to be physically removed by hand cleaning;

It is yet another object of the present invention to provide a more pleasing appearance to a transparent coffee brewing chamber;

An object of the present invention is to provide a system that has a better appearance;

An object of the present invention is to provide a system for reducing waste of ground coffee;

Another object of the present invention is to provide a system that makes more uniform tasting coffee;

Yet another object of the present invention is to provide a system that is easier to clean;

These and other objects of the present invention will be apparent from the following specification and accompanying drawings.

BRIEF DESCRIPTION OF THE DRAWINGS

For a more complete understanding of the present disclosure, reference is now made to the following description taken in conjunction with the accompanying drawings.

FIG. 29A illustrates a perspective view of an alternative embodiment of a magnetically driven vortex-producing beverage cleaning system with an insertable soap key having soap tablets in accordance with an aspect of the present disclosure;

FIG. 29B illustrates a detail view of a portion of FIG. 29A;

DETAILED DESCRIPTION

The detailed description set forth below, in connection with the accompanying drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts. As described herein, the use of the term "and/or" is intended to represent an "Inclusive OR", and the use of the term "or" is intended to represent an "exclusive OR."

Figure 1:
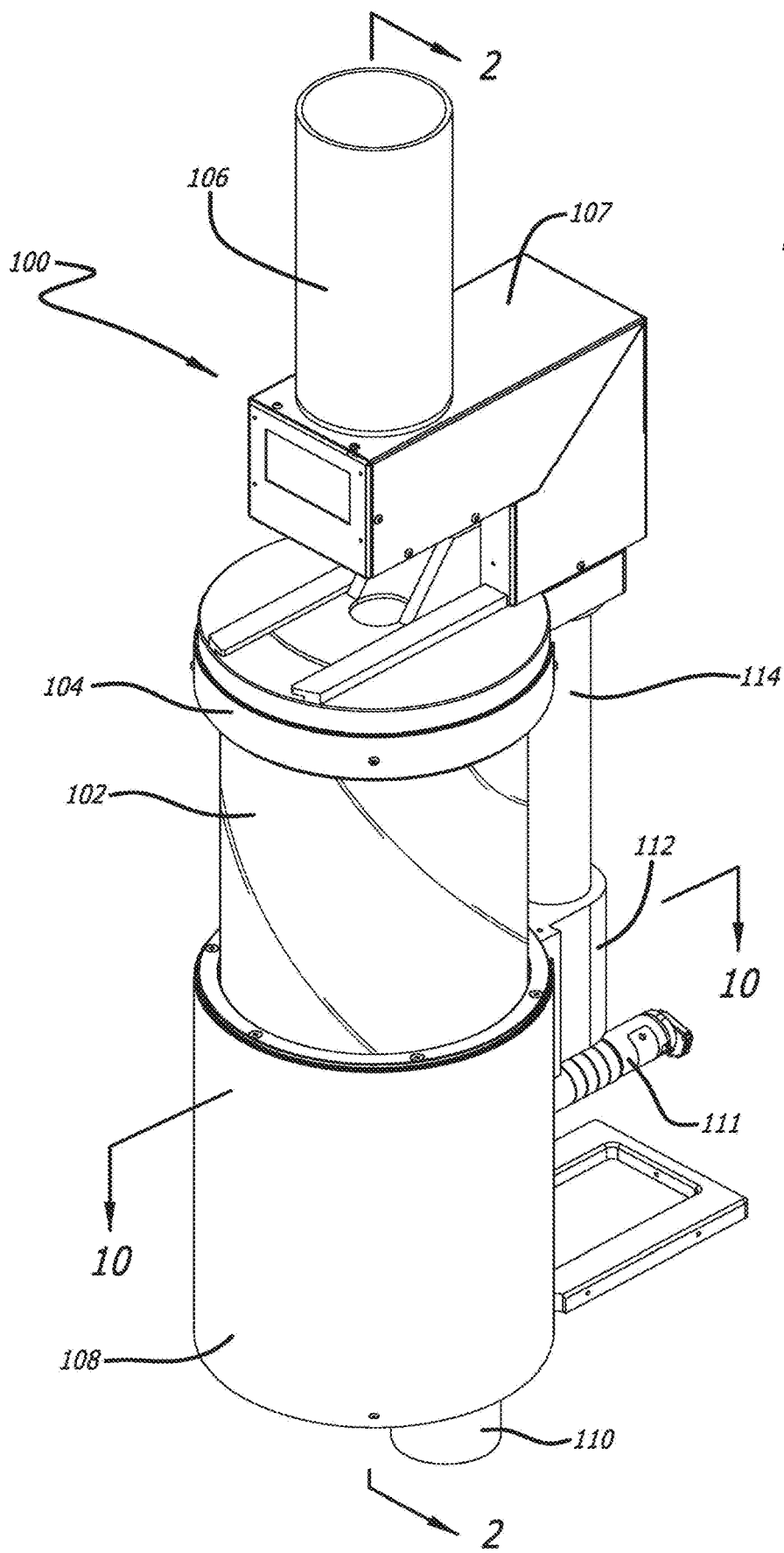
FIG. 1 illustrates a first perspective view of a magnetically driven vortex-producing beverage brewing system in accordance with an aspect of the present disclosure.

As shown in FIG. 1, the beverage brewing system 100 broadly comprises a brew vessel 102, a cover 104 the top of the brew vessel 102, and a bean grinder assembly 106 disposed on the cover 104. The bean grinder assembly 106 has a grinder assembly housing 107. In addition, the lower portion of the brew vessel 102 is disposed on and within a base 108. The base, in the preferred embodiment, is made of stainless steel. An outlet chute 110 is coupled to and in fluid communication with a second end of the brew vessel 102, opposite the first end beneath the base 108. A housing 112 coupled to the base 108 is adapted to house elements of the beverage brewing system. The base 108 also has a conduit seat 113 (shown in FIG. 3) that extends from the base 108 and receives a conduit 114 that extends from the conduit seat 113 to the cover portion 104. The conduit 114 is adapted to support the cover 104 and the bean grinder assembly 106, and provides a channel for housing fluid and/or water and electrical lines to allow fluid and/or water and electricity to be supplied to different parts of the beverage brewing system 100 using tubing, electrical wiring, and the like. Water inlets 800 (shown in FIG. 2) connect to the interior of the brew vessel 102.

A portion of the walls of the brew vessel 102 above the base 108 may be made of glass or other transparent material, in order to provide a view of the vortex-producing brewing process. However, the brew vessel 102 may be made of completely opaque material. The brew vessel 102 is capable of handling temperatures of up to and including about 500 degrees Fahrenheit. The brew vessel 102 has a secondary transparent layer disposed on an exterior of the transparent portions of the walls the brew vessel 102. The secondary transparent layer is used for temperature isolation to help maintain a desired temperature for the brewed beverage and leak containment should the brew vessel 102 leak. The secondary transparent layer is an exterior plexiglass tube, a vinyl wrap, a polycarbonate wrap, or the like. It should be appreciated by those skilled in the art that the brew vessel does not necessarily need to be transparent and can instead be opaque or completely non-transparent.

Figure 12:
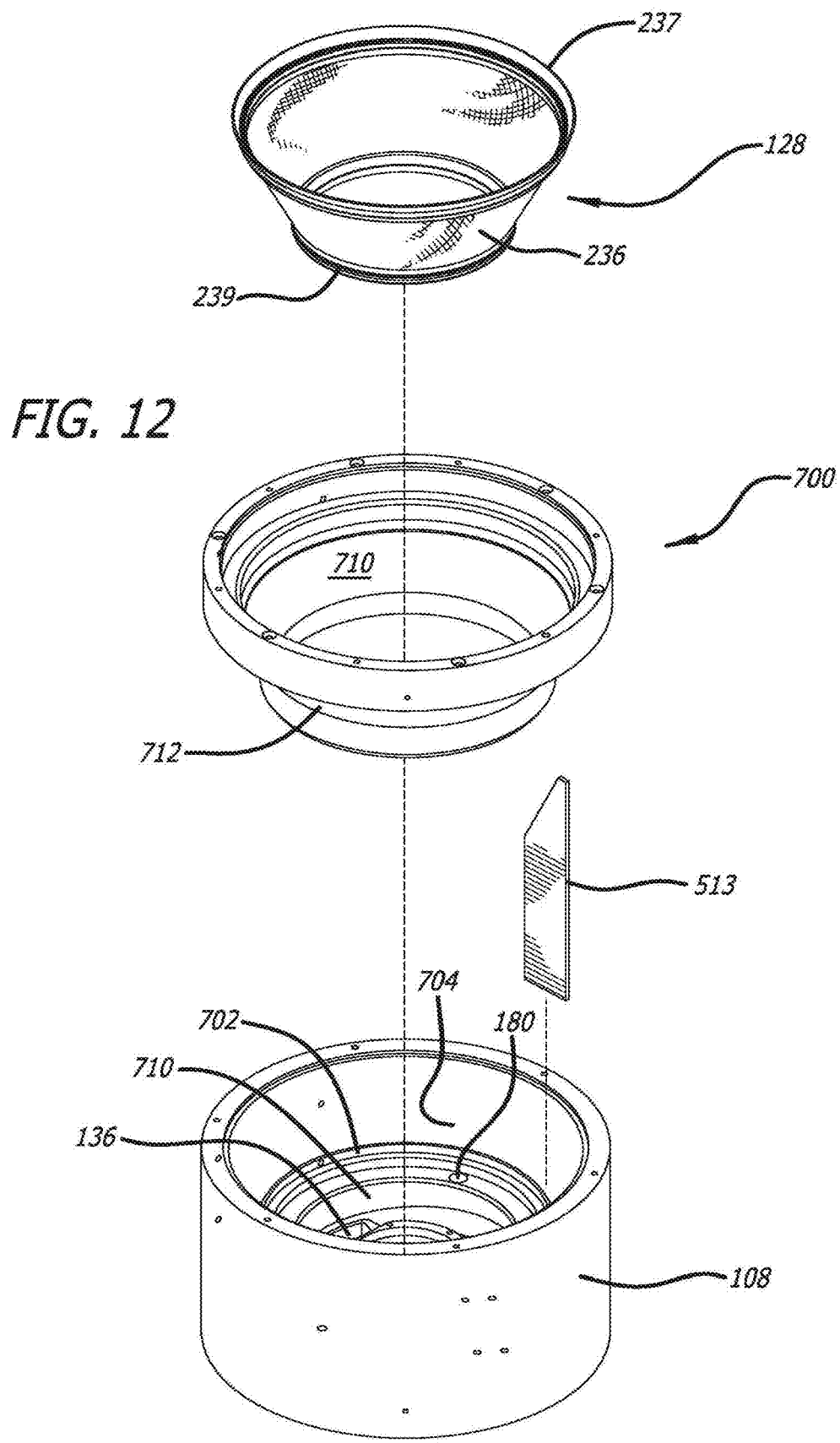
FIG. 12 illustrates an exploded perspective view of the components of FIG. 11 supporting the filter.

The filter 128 shown separately in FIG. 12 includes upper and lower filter seals 237 and 239 and the filter material 236. The filter material 236 is made of mesh or woven nylon, but may be made of other mesh or woven heat resistant materials, such as polymer mesh filter, polyester filter membrane, properly constituted metal, nylon, or anything that has holes in the correct proportions that promotes filtering. Filters with pore sizes in a range of approximately 35 to 40 microns are used in the preferred embodiment. The filter 128 is conical and open at both ends and approximately 4 inches tall with an upper diameter of 9 inches and a lower diameter of 5 inches. Other shapes and dimension may be used as well.

Figure 13:
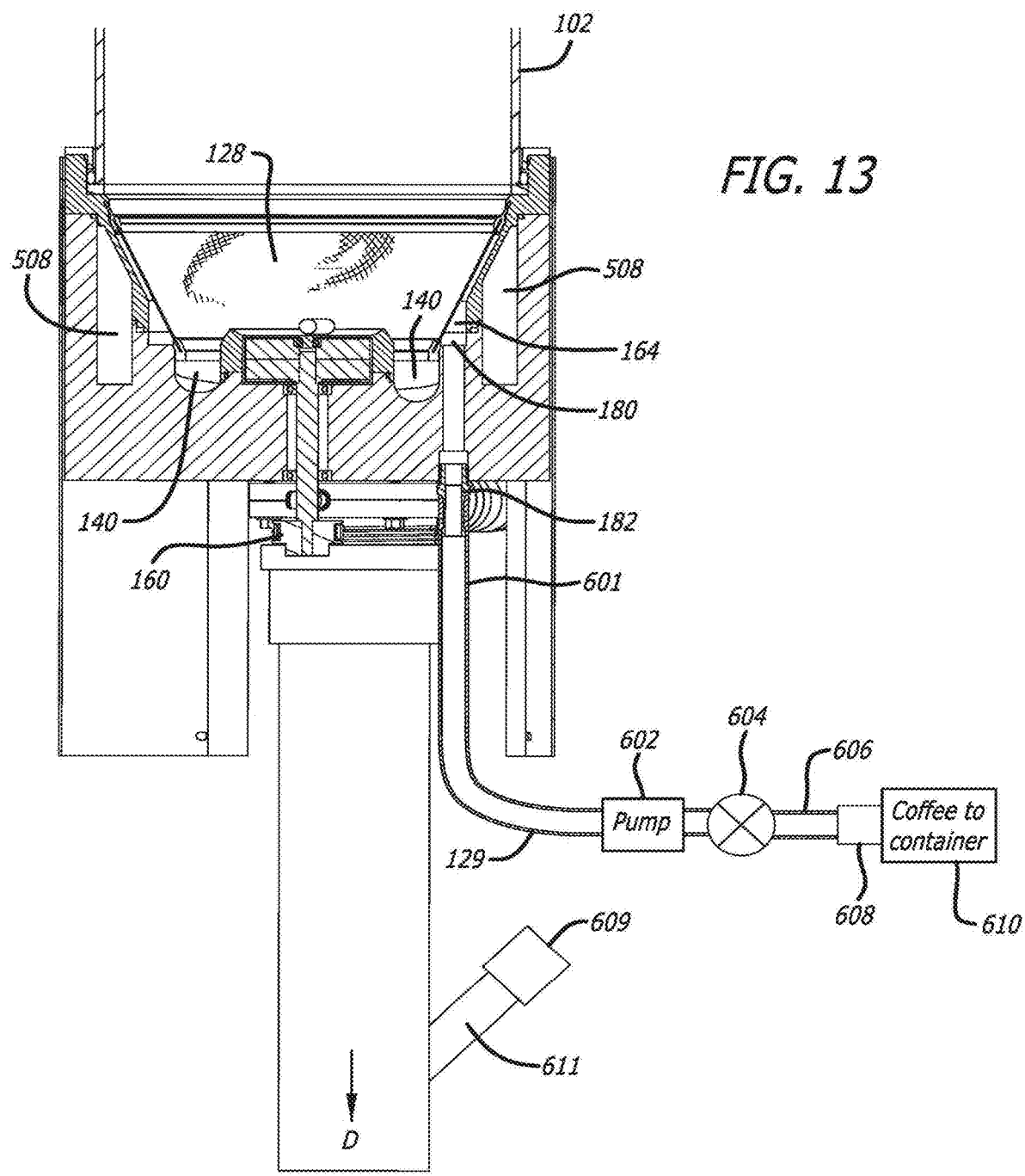
FIG. 13 illustrates the coffee removal line from a beverage brewing system to the coffee container.

As shown in FIGS. 12 and 13, a conical filter support ring 700 supports the filter 128. The conical filter support ring 700 fits within base 108 and rests on ledge 702. The internal wall 704 of the conical filter support ring 700 is spaced from the filter 128 leaving a narrow opening for passage of the filtered coffee to a coffee accumulation reservoir 164. The external portion 712 of the conical filter support ring 700 creates one wall of the annular heat exchanger 508, and the internal tapered portion 704 forms the other wall of the annular heat exchanger 508. Partition 513 controls the flow of water within the annular heat exchanger 508.

Figure 2:
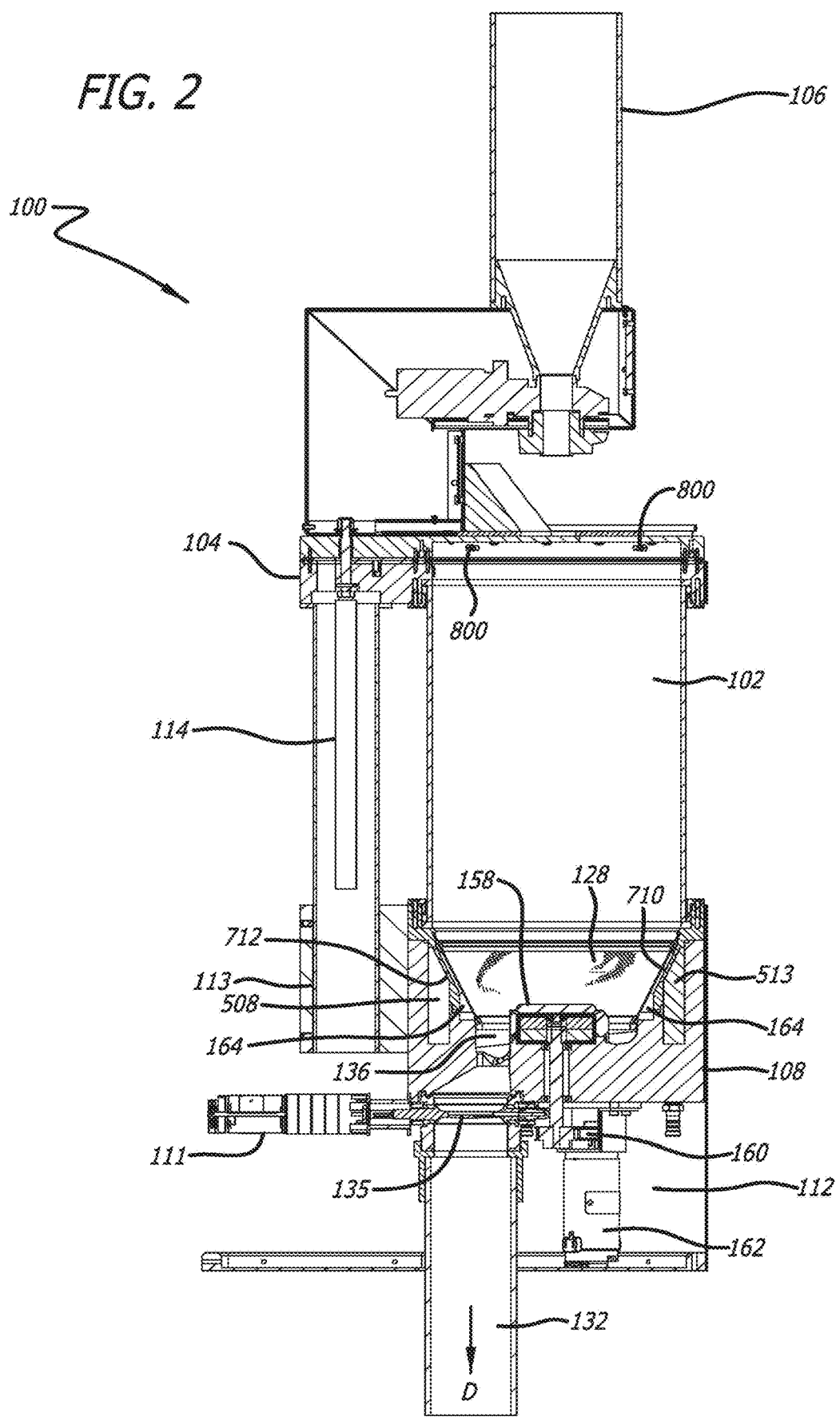
FIG. 2 illustrates a first detailed sectioned view along lines 2-2 of FIG. 1 of the magnetically driven beverage brewing system in accordance with an aspect of the present disclosure.
Figure 3:
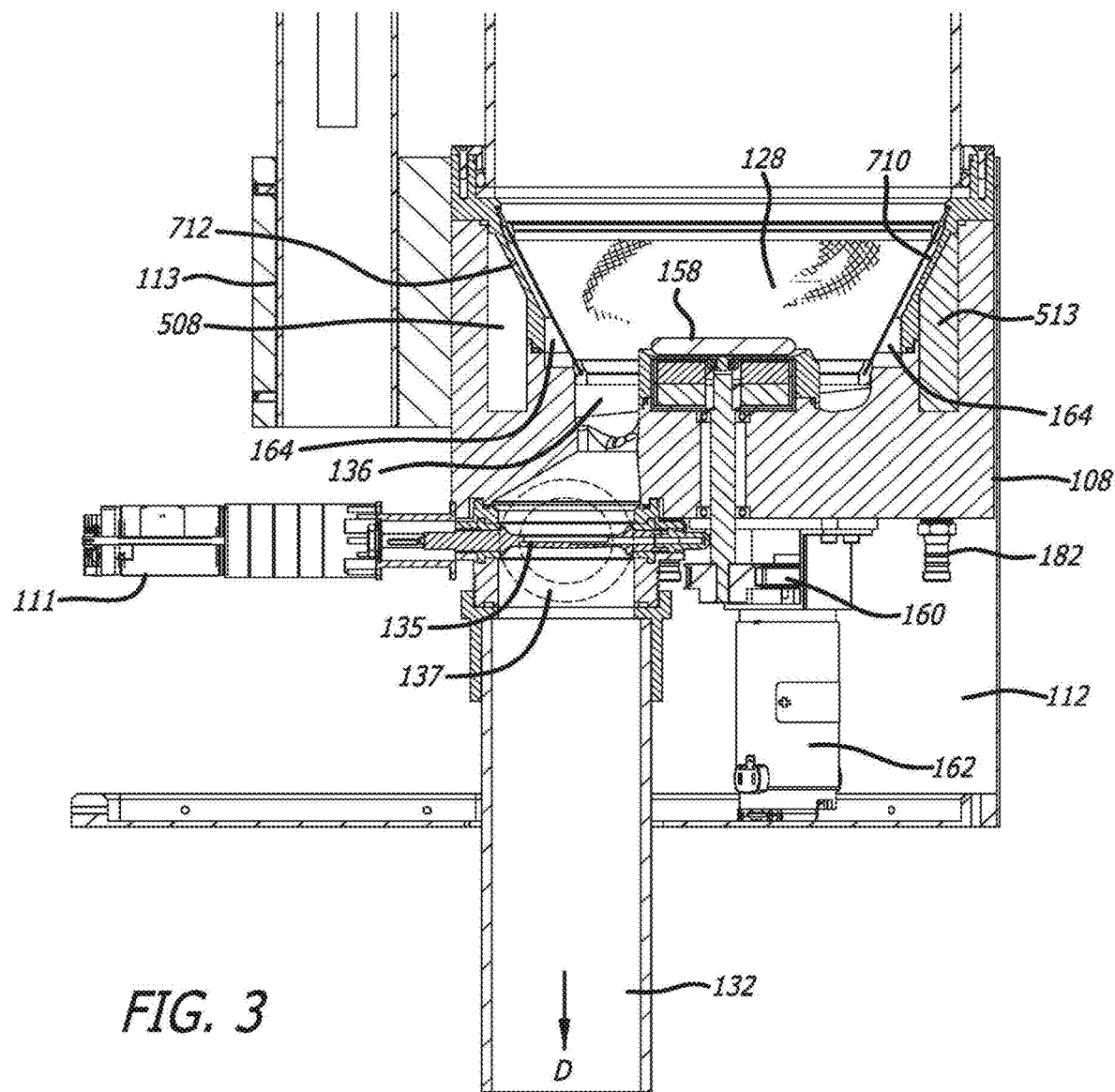
FIG. 3 illustrates an enlarged detailed sectioned view of the lower portion of the magnetically driven beverage brewing system of FIG. 2 in accordance with an aspect of the present disclosure.

As shown in FIGS. 2 and 3, the brew vessel 102 also includes a magnet stirrer 158 disposed in a lower portion of the brew vessel 102. The magnet stirrer 158 rotates at a speed sufficient to mix the coffee grounds and water under different loads. The speed of the stirrer is preferably fast enough to form a fluid/water vortex. The magnet stirrer is a magnet and may be covered in plastic or other inert material to prevent corrosion from contact with the water during brewing.

Figure 8:
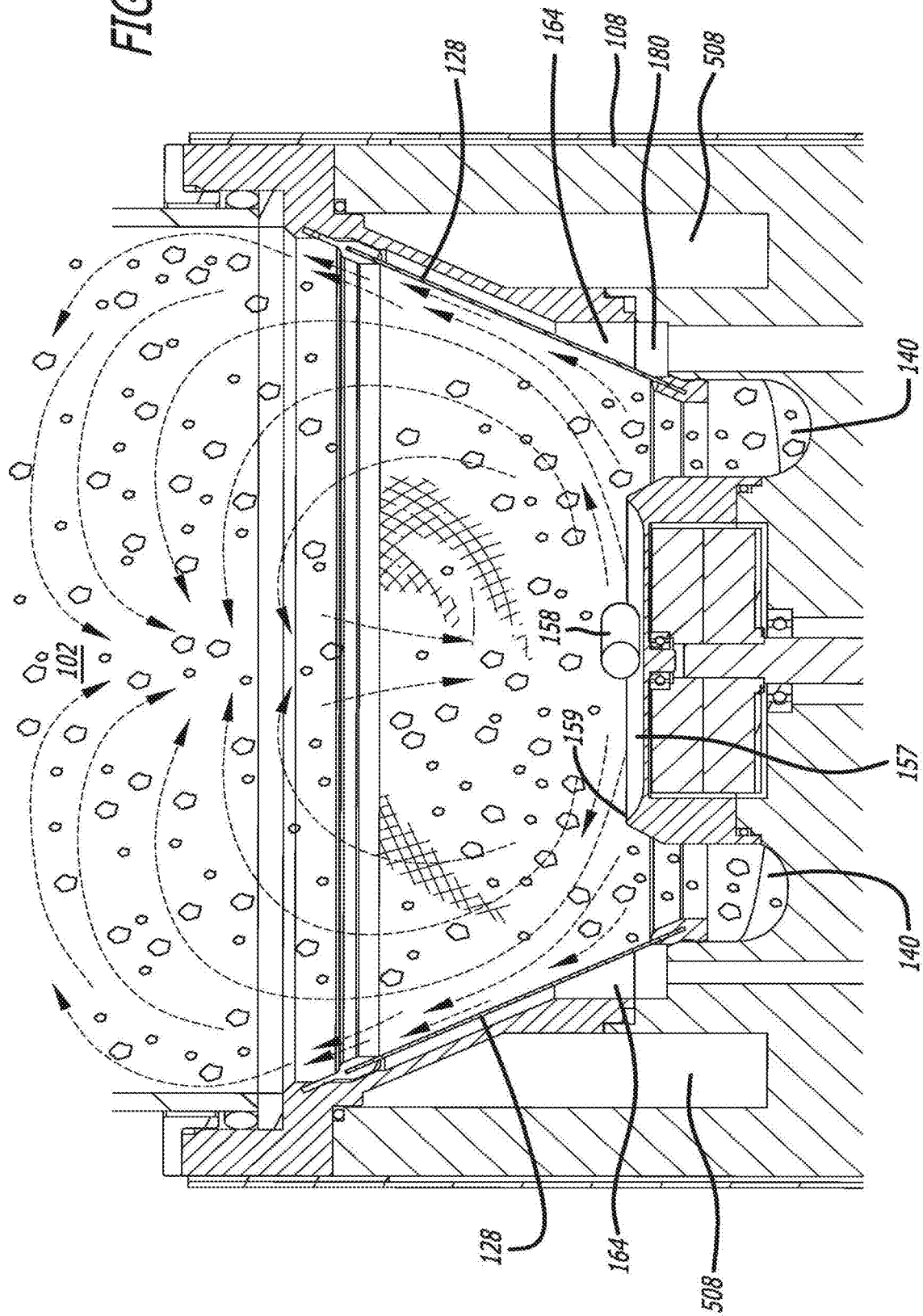
FIG. 8 illustrates a diagrammatic view of the flow of the fluidized bed of coffee during the brewing cycle.

The magnet stirrer 158 is fitted within a substantially nonmagnetic dish 157 in the bottom of the brew vessel 102. The dish 157 serves to limit the ability of the magnet stirrer 158 from leaving its position in magnetic coupling with the motor 162. In addition, as shown in FIG. 8, during brewing the lip 159 of the dish 157 directs the flow of the fluidized slurry in a generally upward direction that is substantially parallel or tangential to the surface of the filter 128. The magnet stirrer 158 is capable of stirring the water and ground coffee for a selected amount of time, and at different speeds over the period of time based on the beverage desired to be produced. After the coffee brewing cycle, the magnet stirrer 158 is used to agitate the water and cleaning solution to rinse and clean the beverage brewing system 100 as discussed below.

The magnet stirrer 158 is magnetically connected to an electromechanical drive system (e.g. motor 162 and drive train 160) positioned outside of the brew vessel to avoid complex sealing mechanisms and/or the need to seal shafts from the exterior to the interior of the brew vessel 102. It should be appreciated that the motor 162 may also directly drive the magnet stirrer 158, without an intervening drive train. As illustrated, the rotating platform and magnet stirrer 158 are rotationally positioned in a substantially centrally located position of the base 108.

While a magnet stirrer is described above, it is possible that a motor driven blade system could also be used in its place. Such a blade system would require a waterproof housing for the blade, shaft and bearings, and/or seals for preventing leakage from the brew vessel 102. It is recognized that any seals or metal parts in constant contact with hot water would be subject to deterioration and leakage. The use of a magnet stirrer 158 avoids such leakage.

A region surrounding the magnet stirrer 158 and exterior to the filter 128 defines beverage/coffee accumulation reservoir 164 where the brewed beverage accumulates for withdrawal through coffee outlet opening 180 and coffee outlet line 182 by the flexible coffee removal line 129.

As shown in FIGS. 4 and 10-12, the base 108 has a surrounding annular heat exchanger 508 to circulate hot water in and out of the annular heat exchanger 508 in order to heat the brew vessel 102 and the fluidized slurry during brewing to the desired temperature. In the event the water is too hot, cooler water is passed from the refrigerator unit 202 and into the annular heat exchanger 508. The hot water, typically approximately 195° F. from a water source 500 heated by a hot water heater 502 is pumped by pump 504, controlled by valve 512, into inlet 506, around the annular heat exchanger 508 and out of outlet 510 and back to the hot water heater 502. Partition 513 controls the direction of the water flow. The pump 504, the valve 512, and the temperature of the water heater 502 and associated valves are all controlled by controller 514.

Figure 5:
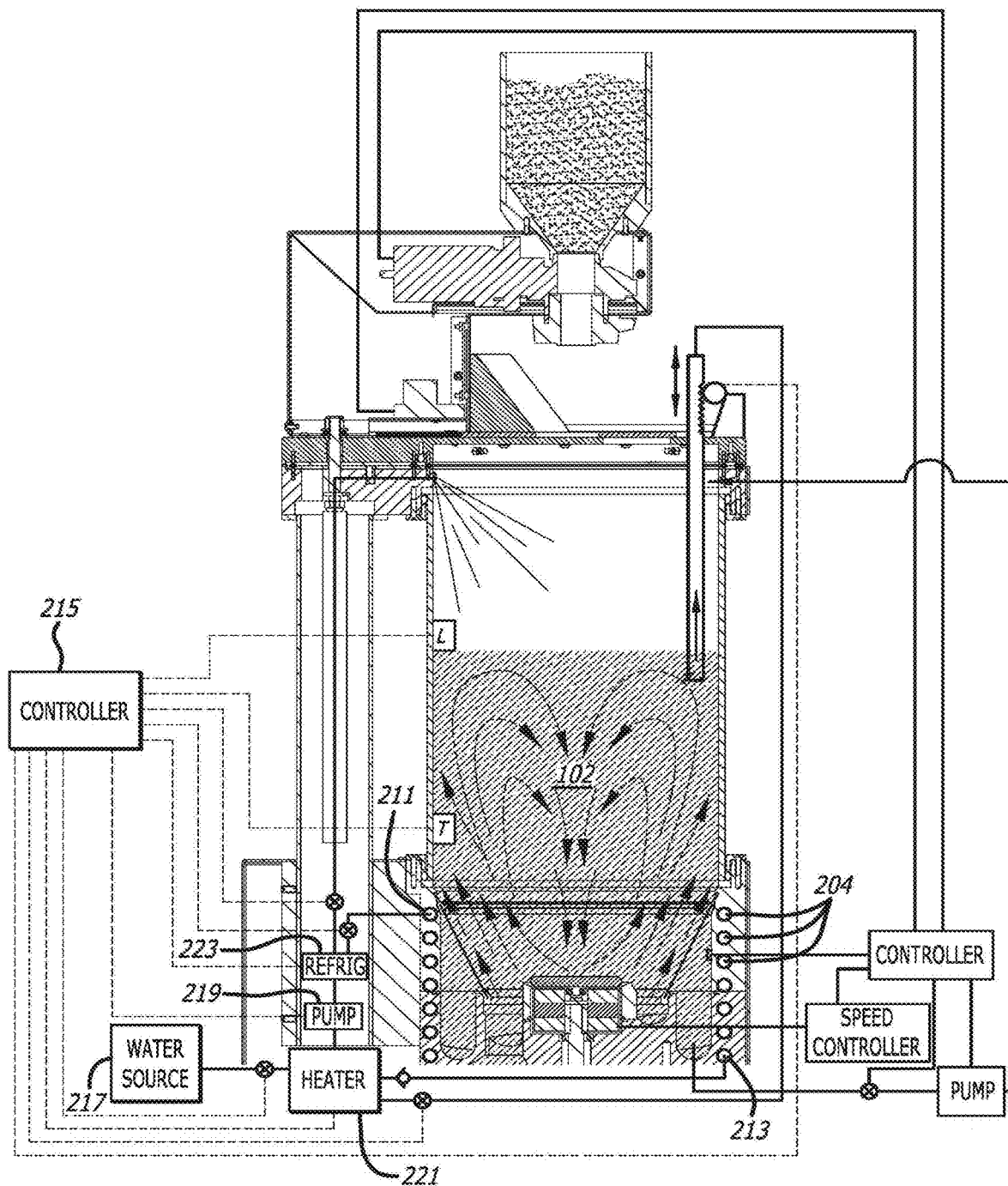
FIG. 5 illustrates a schematic sectional view of an alternative heat exchange for the brewing system of FIG. 2.

As shown in FIG. 5, in an alternative embodiment, a temperature control tube 204 is coiled around the lower portion of the brew vessel 102 to help maintain the temperature of the water instead of the annular heat exchanger 508 described above. Hot or cooling water would enter the coiled tube 204 at one end 211 and exit the other end 213 of the coiled tube 204. A controller 215 controls the flow of water from the water source 217, the pump 219, the heater 221 the refrigerator system 202 and associated valves.

Alternatively the base 108 may be heated by other heat conductive elements (not shown) in addition to or alternatively to heated fluid.

Figure 4:
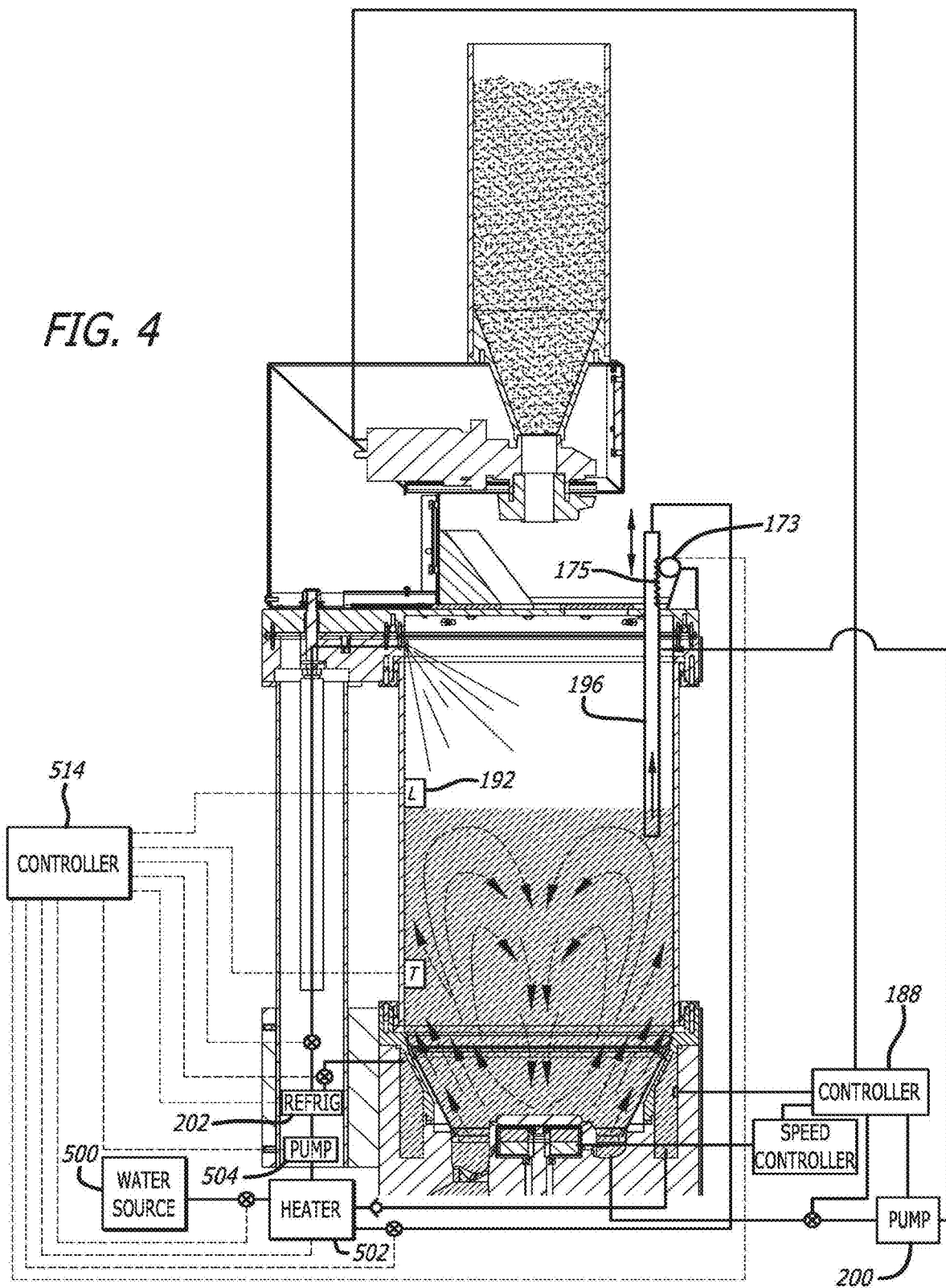
FIG. 4 illustrates a schematic sectioned view along lines 2-2 of FIG. 1 of a control and recirculation system for the heating and cooling of the water of the magnetically driven beverage brewing system of FIG. 1.

In the event additional heating of the fluidized slurry in the brew vessel 102 is found necessary, there is a secondary and independent water circulation system for heating the water in the brew vessel 102, as shown in FIG. 4. Controller 188 controls a recycling tube 196, a hot water heater 502, pump 200, and a refrigerating unit 202 to ensure the water within the brew vessel 102 is at, and maintained at, an optimal temperature for the beverage being brewed. In this embodiment, once the fluid level sensor 192 determines that sufficient water has been dispensed for brewing, the controller 514 causes the recycling tube 196 to be lowered, by motor 173 and flat gear 175 into the brew vessel 102 and the water. The recycling tube 196 is in fluid communication with a pump 200 and periodically (or continuously) draws water from a top portion of the brew vessel 102, where the water may be a cooler temperature than the water at the lower portion of the brew vessel 102, and cycles that drawn water to the heater 198. The system continuously monitors the water temperature by sensor T 193 in the brew vessel 102 until the water reaches the desired temperature.

Alternatively, a pump 200 may pump the water to a refrigeration unit 202 to further regulate the temperature of the water in the event the water in the brew vessel 102 is too hot. Fluid may be pumped from the heater 198 or the refrigeration unit 202 to the at least one nozzle 186 in the top of the brew vessel to permit the water to reenter the brew vessel 102. A temperature sensor 206 may be used to determine when the fluid within the brew vessel 102 is at the optimal/desired temperature. When fluid within the vessel is as the desired/selected temperature, the controller 188 causes the recycling tube 196 to be retracted from the water in the brew vessel 102, and coffee grounds can then be added to the brew vessel 102.

The above described water circulation system is only used before coffee grounds are added to the brew vessel 102. The withdrawal of the recycling tube 196 before coffee grounds are added to the brew vessel 102 prevents coffee grounds in the fluidized slurry from coming into contact with the interior of the recycling tube 196, avoiding having to clean the water circulation system components.

Figure 15:
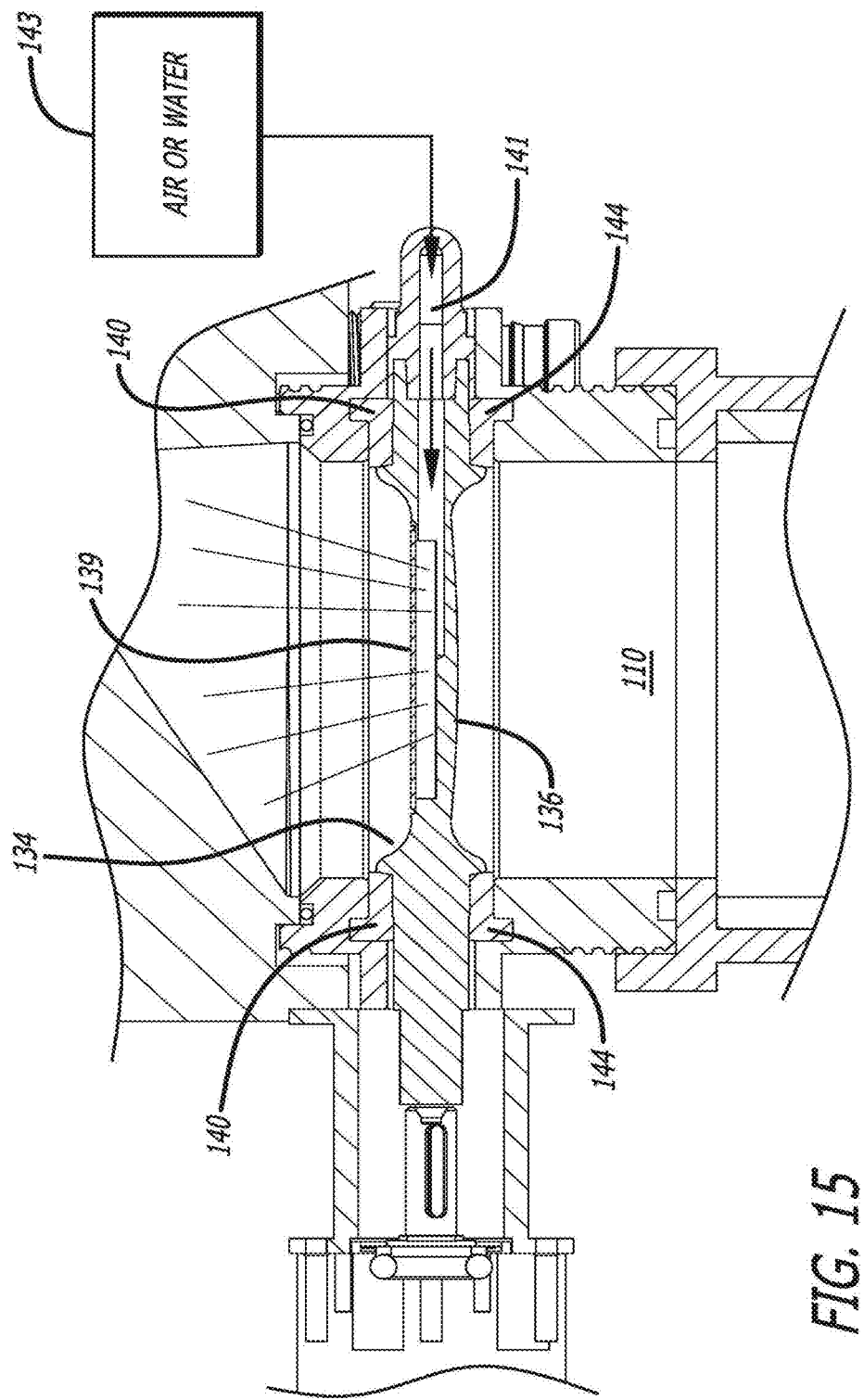
FIG. 15 illustrates the butterfly valve assembly used during cleaning of the coffee machine.

Referring to FIGS. 2, 3, and 15 the outlet chute 110 has at its upper end a butterfly valve assembly 134. The butterfly valve 136 is adapted to actuate between a closed 135 and an open 137 position, shown in dotted lines in FIG. 3. The butterfly valve 136 is controlled by motor assembly 111. When in the closed 135 position used coffee grounds are prevented from passing into the outlet chute 110. When in the open 137 position the used coffee grounds G are permitted to pass into the outlet chute 110 to the drain D as shown in detail in FIG. 15.

The butterfly valve assembly 134 includes a butterfly valve 136, a butterfly valve supports 140, 144. A screen 139 is positioned above the butterfly valve 136 accessible to a water inlet 141, which in turn is connected to a source of air or water 143. The butterfly valve 136 is disposed within the butterfly valve seat 138 and is actuatable relative to the seat 138 to pivot. The butterfly valve 136 and the butterfly valve seat 138 are housed between butterfly valve assembly housing portions 140, 142.

Figure 16:
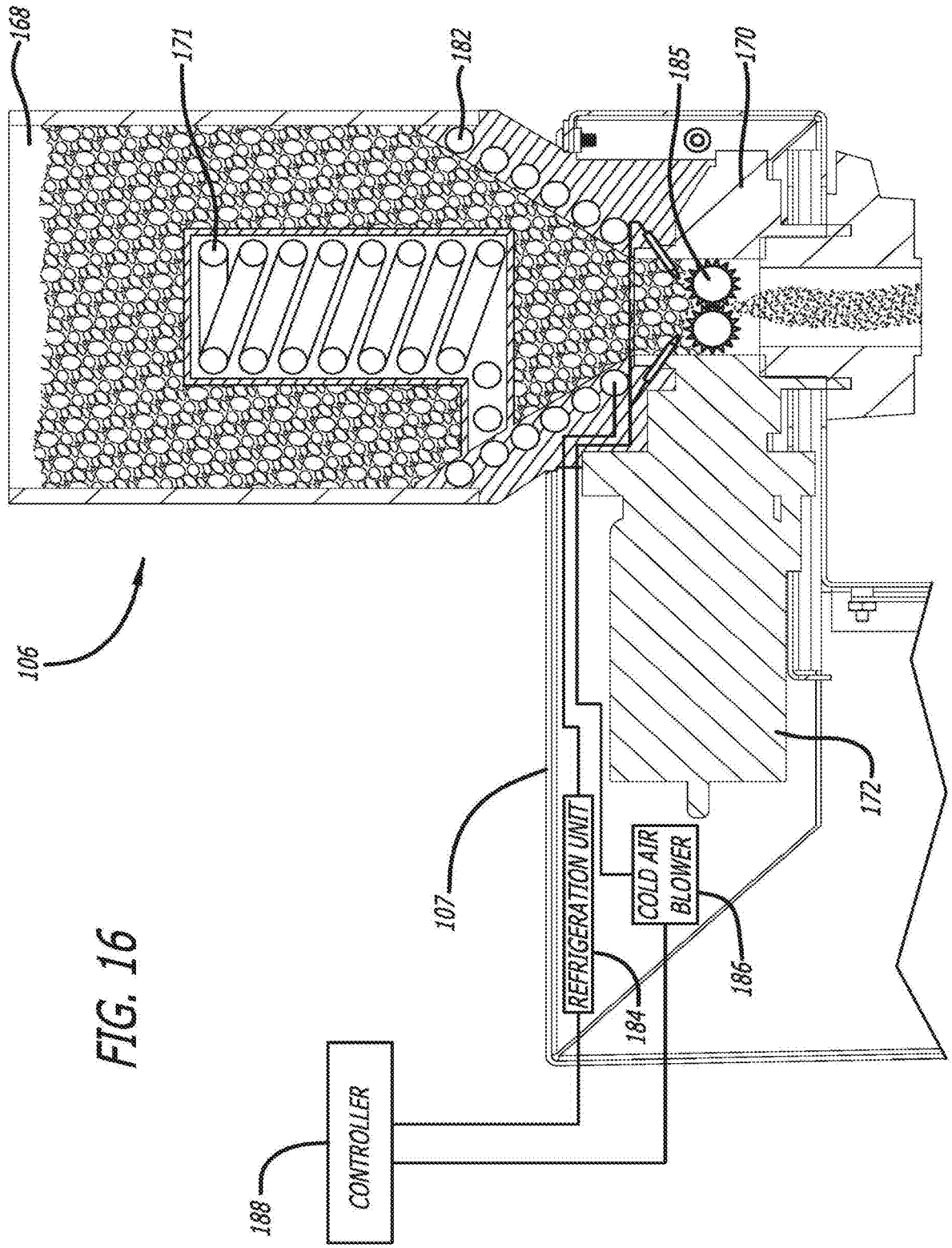
FIG. 16 illustrates a schematic sectioned view of the chilled bean grinder for the magnetically driven beverage brewing system of FIG. 1.
Figure 17:
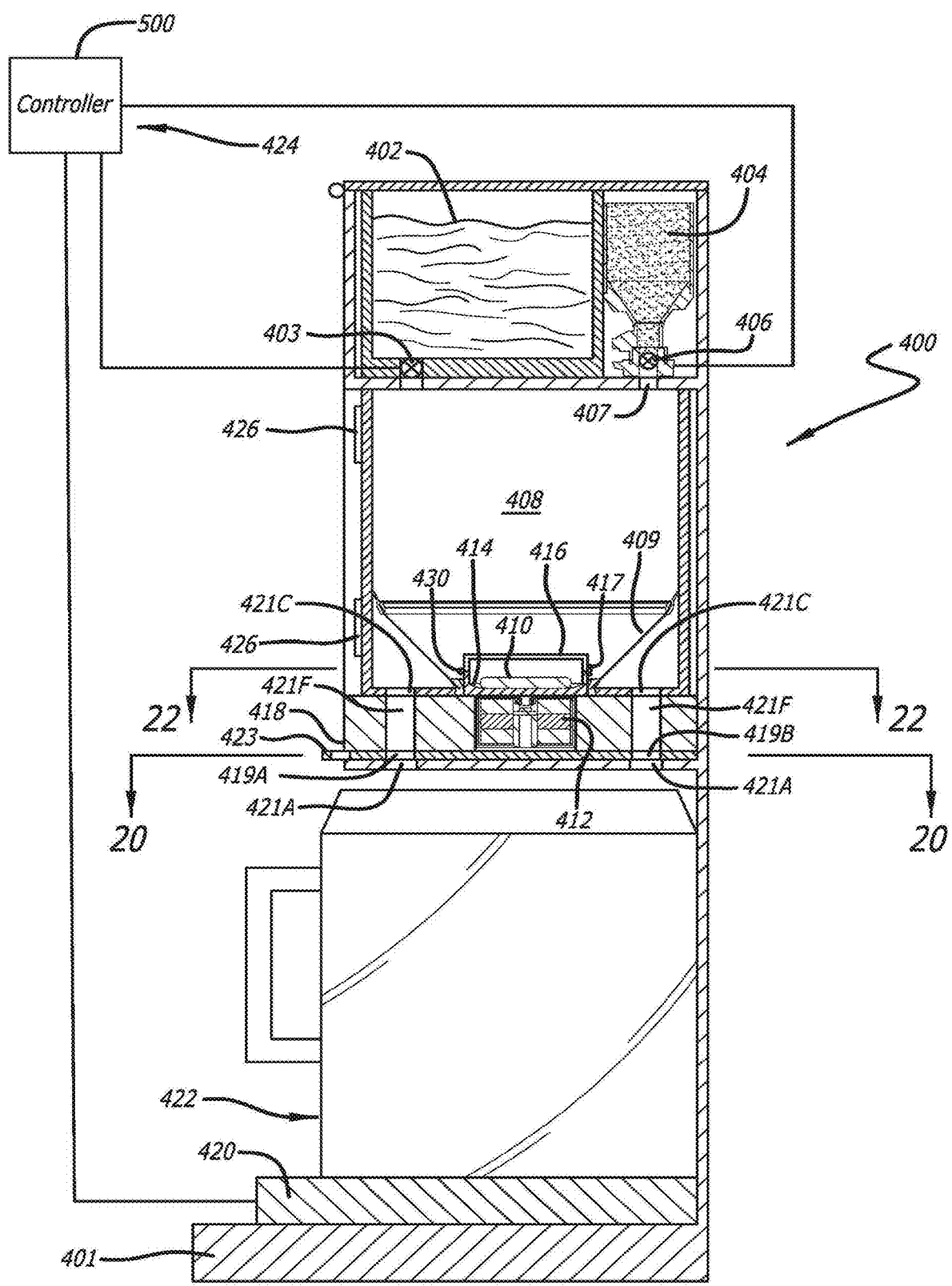
FIG. 17 illustrates a side sectional view of the home version of the present invention in its closed operating position.

As shown in FIG. 16, the bean grinder assembly 106 includes a bean hopper 168 adapted to store and prepare beans (or other ingredients), e.g., coffee beans, for grinding to produce grounds to be introduced into and used in the beverage brewing system 100 to brew a beverage. The bean hopper 168 is coupled to a grind housing 170 to allow the coffee beans to be dropped into the grind housing 170, where the coffee beans may be ground into beverage (e.g., coffee) grounds, such as by burr grinders. Any other types of grinders can also be used. A bean feeder 171 may be used to create movement within the bean hopper 168 to urge the coffee beans to be pushed into the grind housing 170. A grinding motor 172 is coupled to the grind housing 170 to drive grinders to grind the coffee beans into coffee grounds. The bean grinder assembly 106 has a grounds ramp 174 that is adapted to move to a position to direct coffee grounds dropped from the grind housing through an aperture 176 formed in the cover portion 104 into an appropriate part of the water vortex created by the magnet stirrer 158 in the brew vessel 102 to brew the beverage/coffee. The grinder assembly 106 has a pinion 178 and rack 180 to actuate the bean grinder assembly 106 between an open position where coffee grounds are allowed to enter the brew vessel 102 through the aperture 176 and a closed position where the brew vessel 102 and aperture 176 are sealed.

In an alternative embodiment, the bean hopper 168 may have cooling coils 182 disposed around a bottom portion of the bean hopper 168. The cooling coils 182 may be adapted to keep the coffee beans stored in the bean hopper 168 cool, prior to grinding, to produce a higher quality brewed beverage. The cooling coils 182 may be kept cool by a refrigeration unit 184 disposed within or proximate to the grinder assembly housing 107. By way of illustration, a cold air blower 186 may be disposed within or near the grinder assembly housing 107. The cold air blower 186 may be adapted to blow cold air on the coffee beans as they enter the grind housing 170, with a portion of the cold air coming into contact with the grinders to maintain the grinders at a cold temperature. The refrigeration unit 184 and the cold air blower may be controlled by a controller 188.

The entire cycle of the coffee beverage brewing system of the present invention will now be described. The brew vessel 102 is filled with water from nozzle 190 to automatically feed a desired amount of water to be used to brew a brewed beverage into the brew vessel 102. In the preferred embodiment, the brew vessel has a capacity of 5 gallons, and is filled with approximately 3 gallons of water for brewing, although it should be appreciated that systems according to the disclosure may be implemented at smaller or larger scale.

The nozzle 190 feeds water from water conduit 192 connected to a water source 191. The water source 191 may be any of various sources of water capable of feeding water into the brewing system 100 such as a water tank, reservoir, filtered dispenser, or the like. The water conduit 192 may be any of various types of pipe, tubing, or the like capable of transporting water from the water source 191 to the at least one nozzle 190. The nozzles 190 feed water into the brew vessel 102 until a desired capacity is reached, as determined by a fluid level sensor 194. The fluid level sensor 194 may be any of various sensors capable of detecting a quantity of flow or level of fluid within a container, such as flow sensors, capacitive sensors, optical sensors, strain gages or the like. At the same time, hot water is pumped through the annular heat exchanger 508 to heat the brew vessel 102. Before the ground coffee G is inserted into the brew vessel 102 only water is in the brew vessel 102. Water passes through the filter 128 into the accumulation reservoir 164, filling up the accumulation reservoir, until the coffee is withdrawn. Some coffee may pass through the filter 128 during brewing due to the hydrostatic head of the water as well as due to the pressure from the fluidized slurry being forced against the filter.

If the secondary water recycling tube system has been used, once the selected temperature of the water is reached, the controller 188 causes the recycling tube 196 to be withdrawn from the water. As described above, the recycling tube 196 is only used when the annular heat exchanger 508 is insufficient for the water in the brew vessel 102 to be at the selected temperature.

The controller 188 then starts the motor 162 to drive the magnet stirrer 158 to form a hot water vortex in the brew vessel 102. Once the water vortex is formed, the bean grinder assembly 106 grinds beans to produce coffee grounds from the stored coffee beans, as described above. The coffee grounds G are fed from the bean grinder assembly 106 into the water vortex in the brew vessel 102 using the grounds ramp 174 to ensure appropriate placement at a swirling edge of the vortex. Once a predetermined amount of coffee grounds has been dropped into the water vortex, the controller 188 actuates the bean grinder assembly 106 into a closed position to seal the aperture 176 to prevent additional coffee grounds from entering the brew vessel 102.

Referring to FIG. 8 the flow of the fluidized slurry during brewing is shown. The fluidized slurry is directed outwardly (arrows) by the rotation of the magnet stirrer 158 and is directed by the lip 159 of the dish 157 in a generally upward direction toward the filter 128. The flow of the fluidized slurry passes generally parallel or tangentially to the surface of the filter 128 and then continues in an upward direction until it then is directed toward the top of the fluidized slurry and then towards the center of the vortex created by the magnet stirrer 158. The passage of the fluidized slurry along the surface of the filter 128 acts to brush any sediment or small coffee grounds in the fluidized bed away from the filter 128, preventing the filter from being clogged by the sediment, which is silt like. After a selected period of time the magnet stirrer is stopped. A typical brew time is approximately 8 minutes, but depends on the amount of water used, the amount of coffee grounds used and the desired strength of the coffee. Once the brewing is finished the magnet stirrer 158 is stopped and the used coffee grounds in the fluidized slurry are allowed to settle. These used coffee grounds may be considered a set of second coffee grounds, whereby the original complete set of coffee grounds comprise the set of the second coffee grounds.

Figure 9:
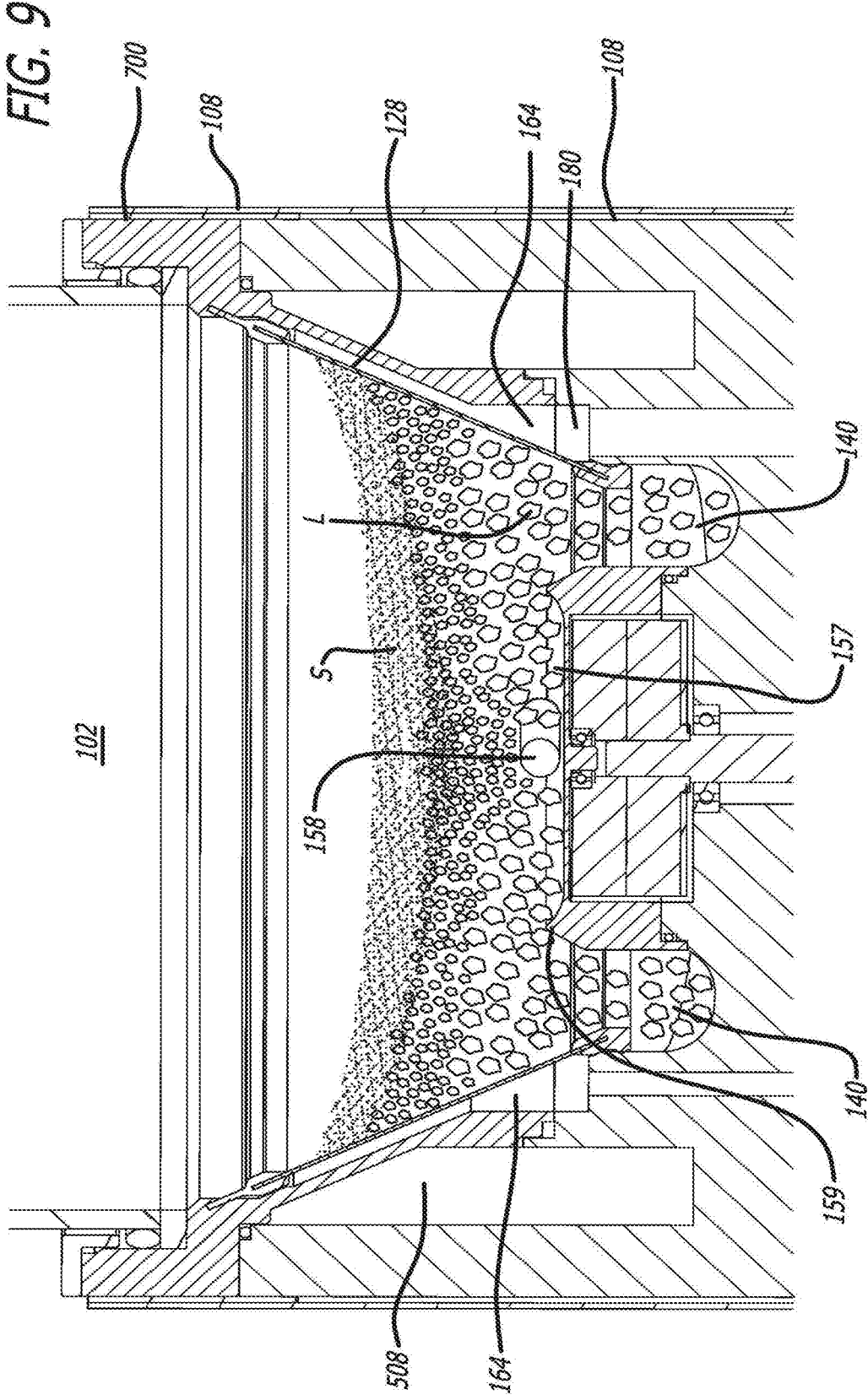
FIG. 9 illustrates a diagrammatic view of the settled bed of used coffee grounds after the magnet stirrer has stopped.
Figure 10:
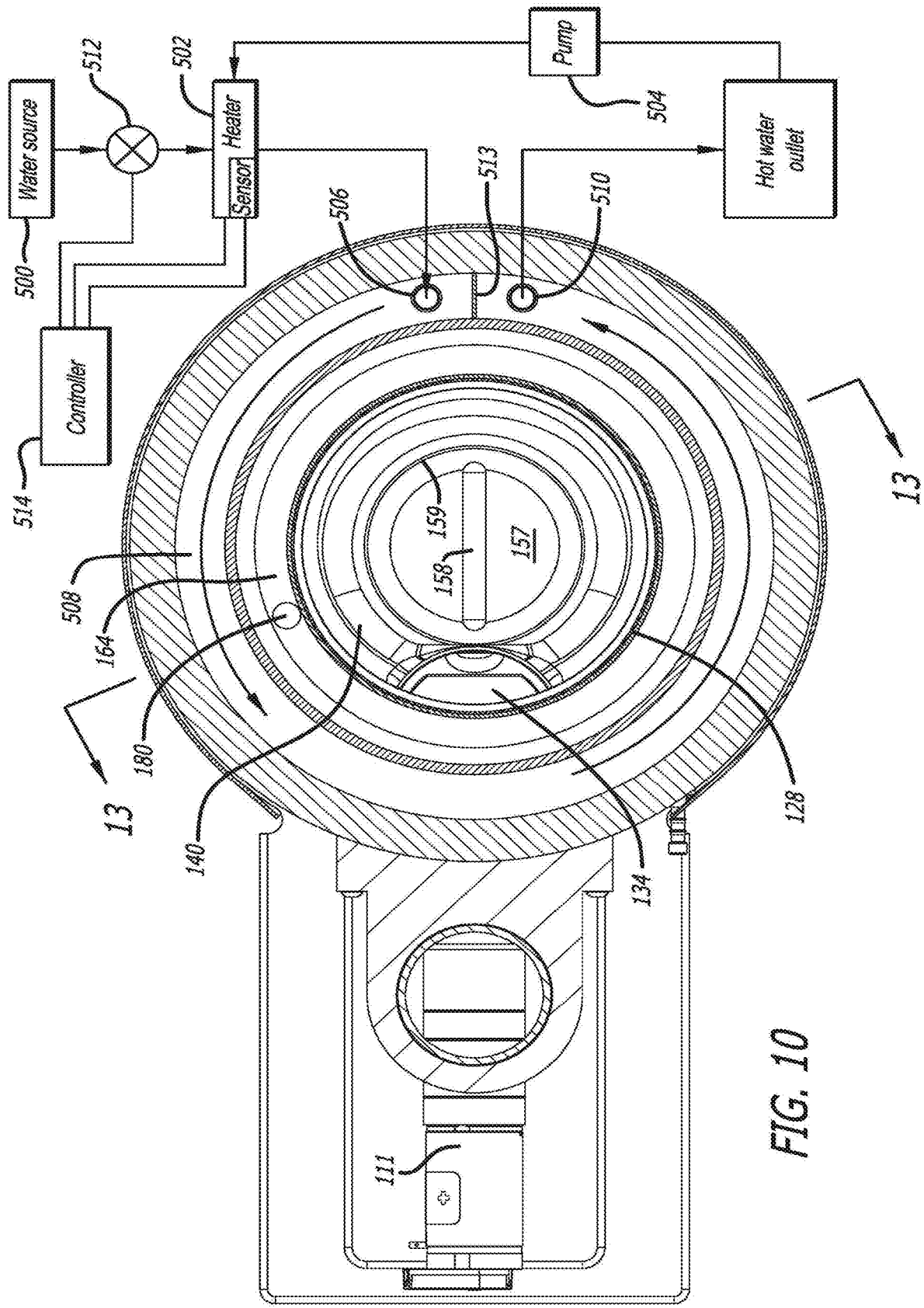
FIG. 10 illustrates a sectional top view of FIG. 1 along lines 10-10 showing the heating/cooling exchanger.
Figure 11:
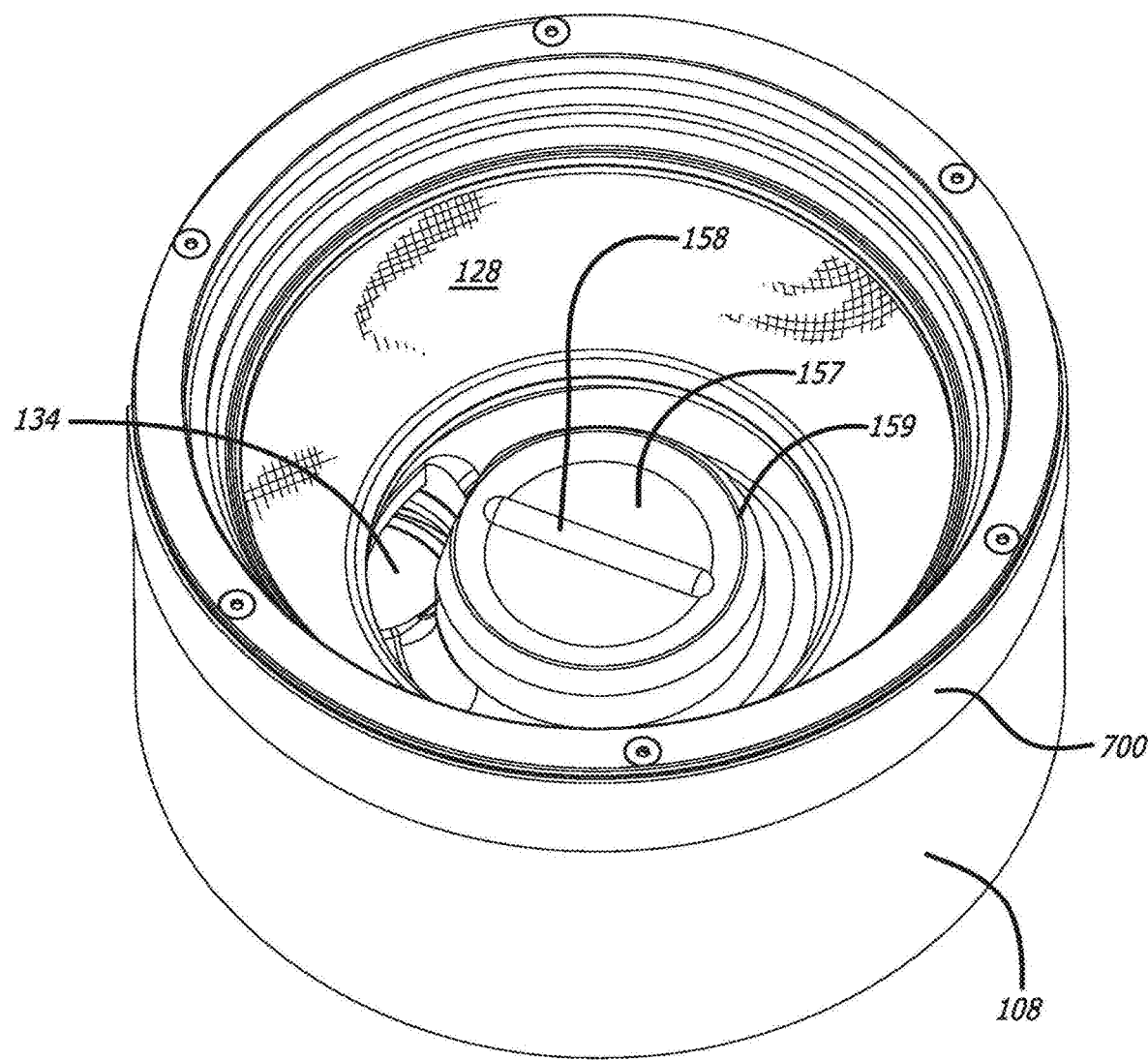
FIG. 11 illustrates a top perspective view of the housing, stirrer and filter of the preferred embodiment of the invention.

The used coffee grounds G are allowed to settle for example, approximately 2 minutes, after the magnet stirrer 158 is turned off. The time of settlement may vary. The used coffee grounds settle to the bottom of the brew vessel and on top of the filter and the butterfly valve and in compartment 140. Referring to FIG. 9 an image of the used coffee grounds is shown. The larger sized grounds (L) of the used coffee grounds settle first due to gravity, with the smallest sized grounds settling last (S). The intermediate sized grounds settle in between. The top layer of the used coffee grounds (S) is essentially sediment having a size smaller than the pores or openings in the filter 128. Having the larger of the used coffee grounds (L) settle first on the filter 128 prevents the smallest particles of the used coffee grounds (S) from fitting within the pores of the filter 128 and substantially passing through the filter 128 clogging the openings in the filter 128.

The result of this settling of coffee grounds of various sizes from largest on the bottom to smallest on the top is a bed of coffee grounds having settled with an increasing gradient of size, meaning that the size of grounds generally gets larger moving from the top to the bottom of the bed. The grounds at the top of the bed may be of a fine nature in the form of silt. When the coffee is withdrawn from the system, the coffee goes through the grounds having settled with an increasing gradient of size.

Withdrawing coffee through the settled grounds adds to the coffee's flavor profile. As stated above after the vortex is stopped, formation of a "gradient coffee bed" occurs with largest grounds on the bottom and smaller grounds on the top. But not every particulate with in the brewed coffee will fall via gravity as part of the gradient coffee bed after the vortex is stopped. Due to their small size and light weight, smaller silt particles are likely to be suspended within the brewed coffee even after formation of the gradient coffee bed. These smaller silt particles will detract from the flavor profile of the coffee if they remain in the coffee served to the customer.

When the brewed coffee is withdrawn through the gradient coffee bed, that gradient coffee bed acts as a filter that can block some of the smaller silt particles from remaining in the coffee. The gradient coffee bed holds back particles that are smaller than the apertures of the typical nylon mesh filter that is also installed in the system. The reduction of the smaller silt particles contributes to the improved flavor profile of the withdrawn coffee.

Figure 14:
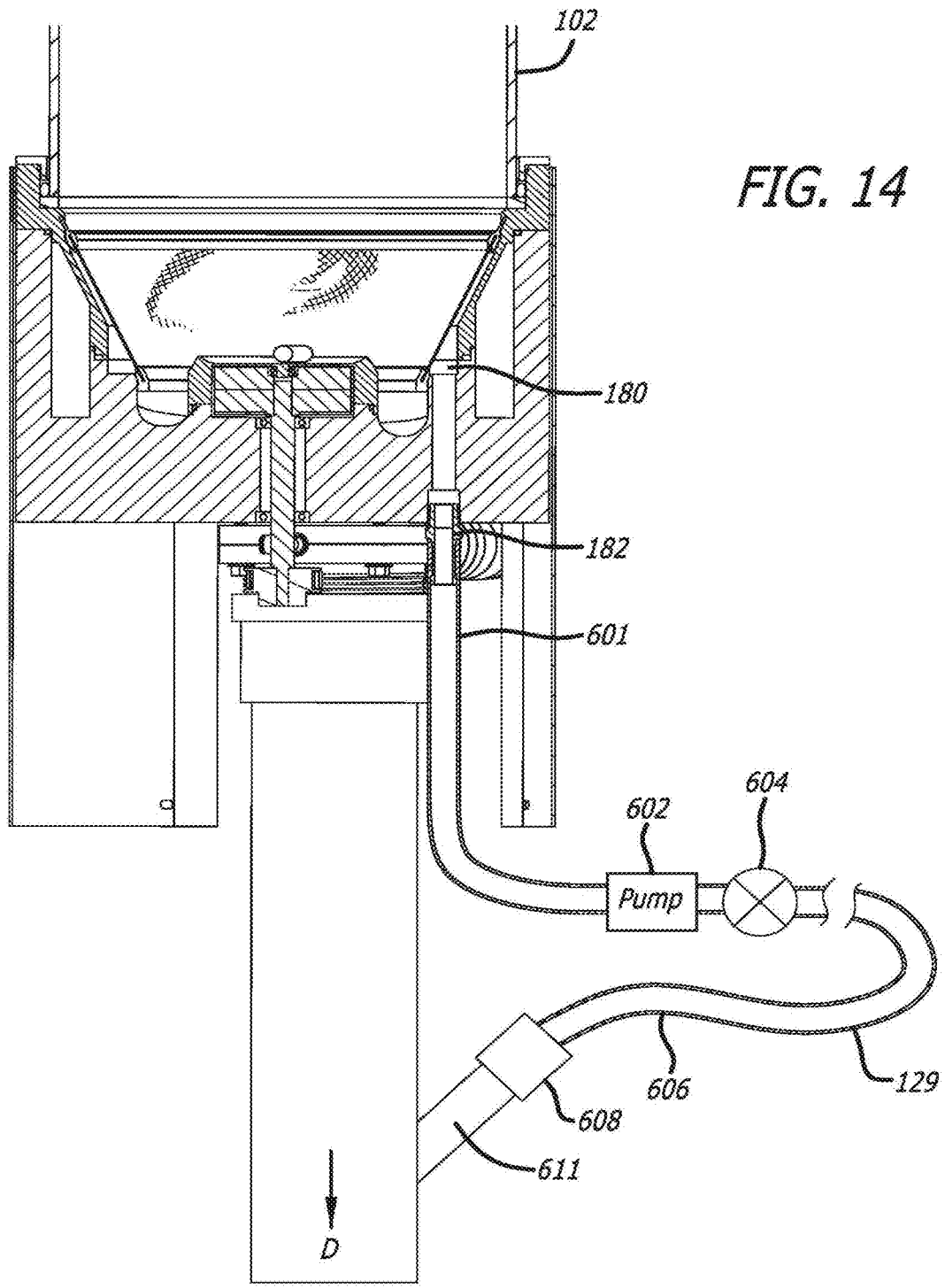
FIG. 14 illustrates the connection of the coffee removal line to the Y connection in the drain.

Referring to FIGS. 13 and 14, the withdrawal of the coffee from the brew vessel 102 is shown. A coffee removal line 129 is made of a flexible heat resistant material. One end 601 of the coffee removal line 129 is attached to the coffee outlet line 182 which in turn is connected to the accumulation reservoir 164 surrounding the filter 128. A pump 602 is used to speed up the withdrawal of the coffee. The pump 602 operates in cooperation with valve 604. It is possible to have the coffee drip through the filter 128 by gravity, as in the home version, to the coffee removal line 129 without the pump 602, but in a commercial environment this would take too long and would be commercially unacceptable. The other end 606 of the coffee removal line 129 has a quick release valve 608 that is connected to the coffee container 610, which also has a corresponding quick release valve. The quick release valve 608 prevents the hot coffee within the coffee removal line 129 from being discharged when not connected to the coffee container 610. After substantially all of the coffee is withdrawn from the brew vessel 102, the coffee removal line 129 is disconnected from the coffee container 610 and the end 606 of the coffee removal line 129 is connected to the drain through the drain Y connection 611. The input to the drain Y connection 611 also has a quick release valve 609. During cleaning of the brewing system, the coffee removal line 129 is also cleaned and the cleaning fluid passes through the coffee removal line 129 and to the drain Y connection 611.

Figure 6:
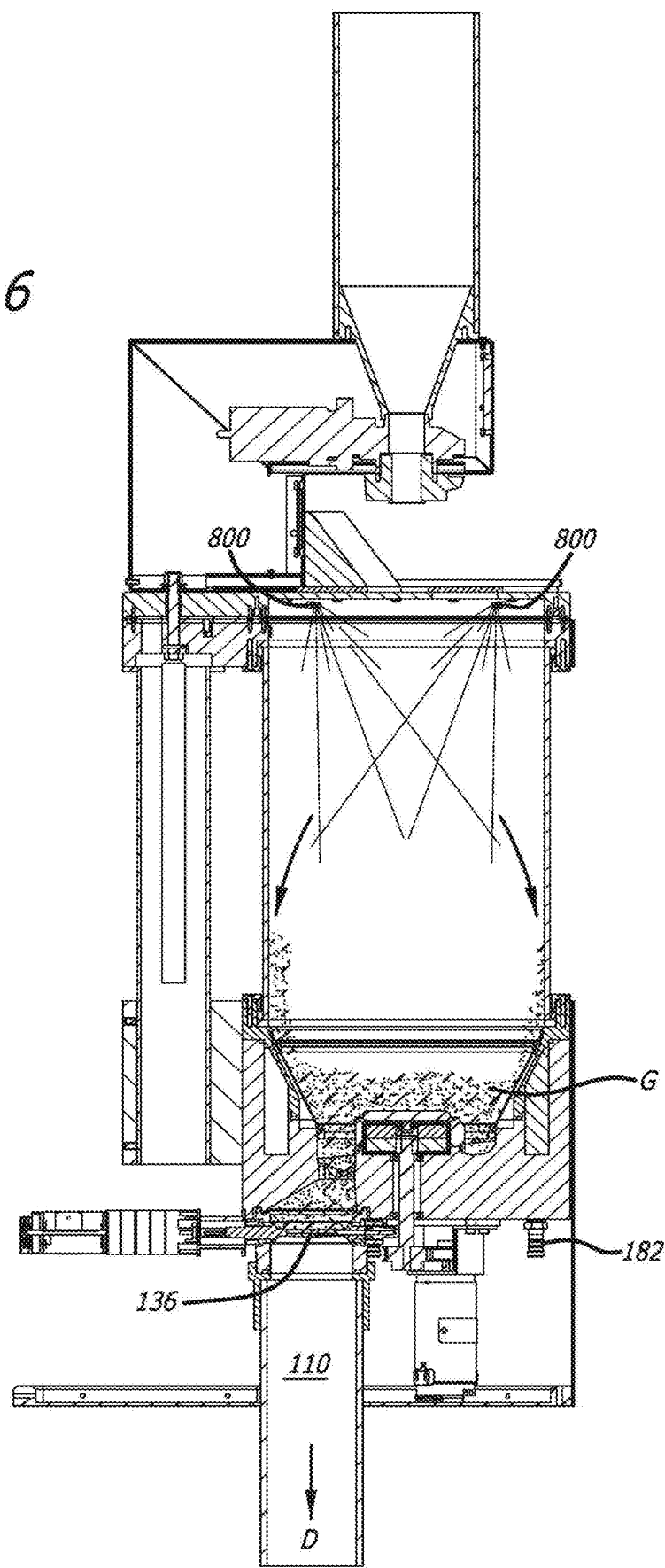
FIG. 6 illustrates a schematic sectioned view of a cleaning system for the magnetically driven beverage brewing system in accordance with an aspect of the present disclosure.

FIG. 6 illustrates the cleaning of the beverage brewing system according to the disclosure. After withdrawing substantially all of a brewed beverage from the brew vessel 102 water is sprayed through nozzles 800 from the top of the brew vessel to wash away any residual coffee grounds G. Further, a soap/cleaning solution may be pumped into the water filling the brew vessel 102. The controller turns on the magnet stirrer 158 to create movement of the cleaning water to aid in the cleaning of the beverage brewing system 100. At the same time, the butterfly valve 136, while in its closed position, has a burst of air or water applied through opening 121 to the screen 139 on the upper portion of the butterfly valve 136 to dislodge any accumulation of used coffee grounds resting on top of the butterfly valve 136. The butterfly valve 136 is then opened, washing the water, cleaning solution and used coffee grounds into the outlet chute 110 and to the drain D. At the same time the butterfly valve 136 is cleaned. The butterfly valve 136 is then closed. A rinse cycle of clean water is then initiated, dispensing hot water into the brew vessel to rinse remaining soap/cleaning solution from inside the brew vessel 102. The butterfly valve 136 is then opened again to discharge the contents to the drain D.

Figure 7:
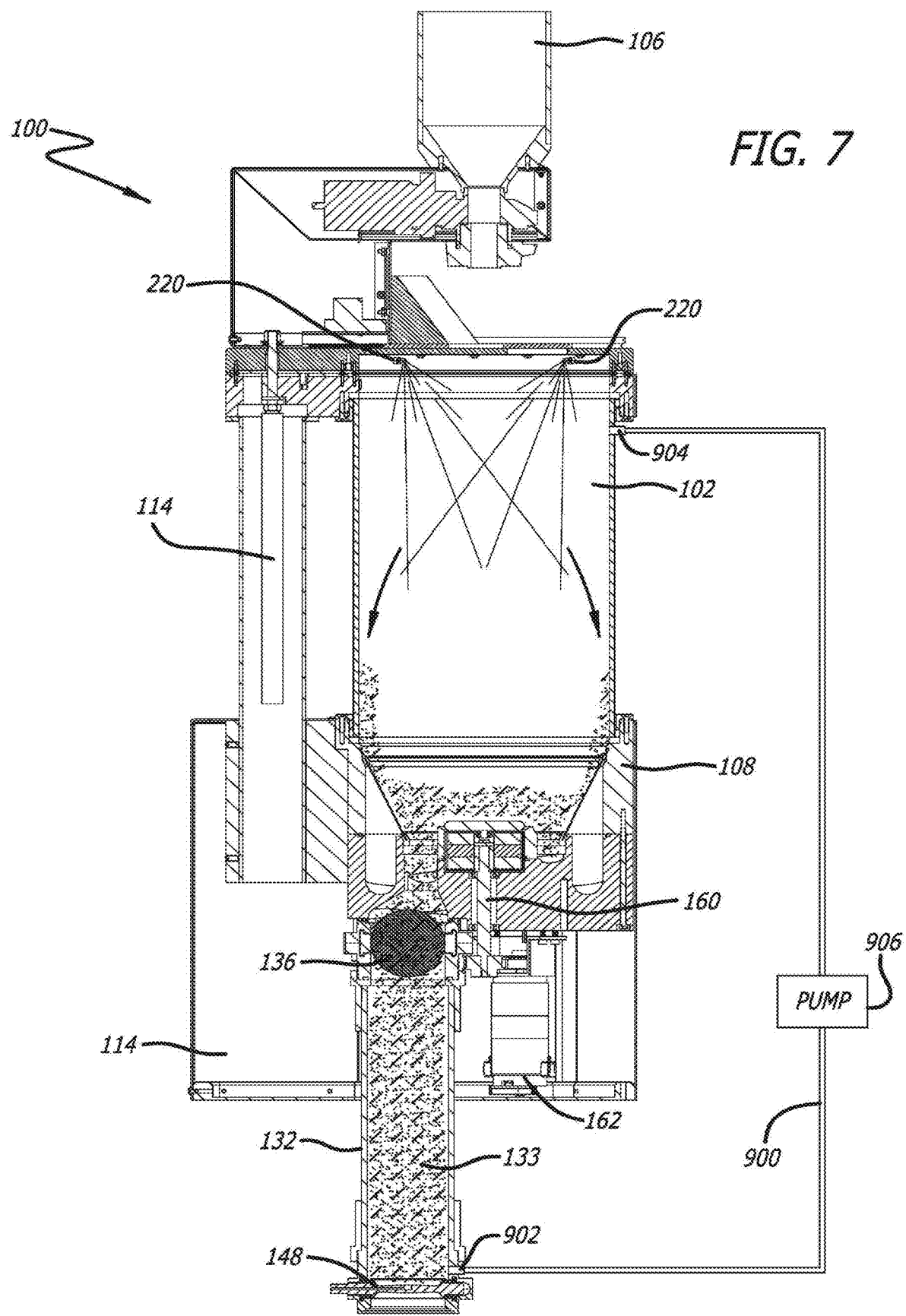
FIG. 7 illustrates a detailed sectioned view of an alternative embodiment of the magnetically driven beverage brewing system of FIG. 1 with an enlarged bottom grounds chamber in the outlet chute and a recycling system.

FIG. 7 illustrates an alternative outlet chute 116 having a first butterfly valve assembly 134 and the second butterfly valve assembly 148 in the bottom grounds chamber 133. As described above, the first butterfly valve assembly 134 actuates between an open position to allow used coffee grounds from the brewing of the beverage in the brew vessel 102 to pass into the bottom grounds chamber 133. The second butterfly valve assembly 148 is disposed adjacent to a second end of the outlet chute 132, and remains closed at the end of the brewing cycle so that grounds descend into the bottom grounds chamber 133 onto the closed second butterfly valve assembly 148. The second butterfly valve assembly has a fine screen. The same as the first butterfly valve 136.

After the coffee has been withdrawn and the used coffee grounds have settled a substantially quick burst of water or air loosens used coffee grounds above the first butterfly valve 136 and the first butterfly valve 136 is then opened to allow the dislodged coffee grounds to fall into the bottom grounds chamber 133 as shown in FIG. 7, while the second butterfly valve assembly 148 remains closed. Once substantially all of the dislodged coffee grounds enter the bottom grounds chamber 133, the first butterfly valve 136 is actuated to the closed position to prevent additional used coffee grounds from entering the bottom grounds chamber 133.

A line 900 is connected to an opening 902 to the bottom of the grounds chamber 133 and is in fluid communication with an opening 904 at the top of the brew vessel 102, so that the residual brewed beverage may be removed from the bottom grounds chamber 133 by pump 906 back into the brew vessel 102.

Once the residual brewed beverage has been pumped back into the brew vessel 102, the second butterfly valve is opened and a burst of water from water supply 139 is adapted to output a substantially quick burst of fluid to dislodge or loosen the used coffee grounds that have collected on top of the second butterfly valve 150 in the bottom grounds chamber 133, similar to the manner the first butterfly valve 136 dislodges or loosens accumulated used coffee grounds as describe above. The residual brewed beverage is then filtered, thereby preventing brewed coffee from being wasted.

Figure 18:
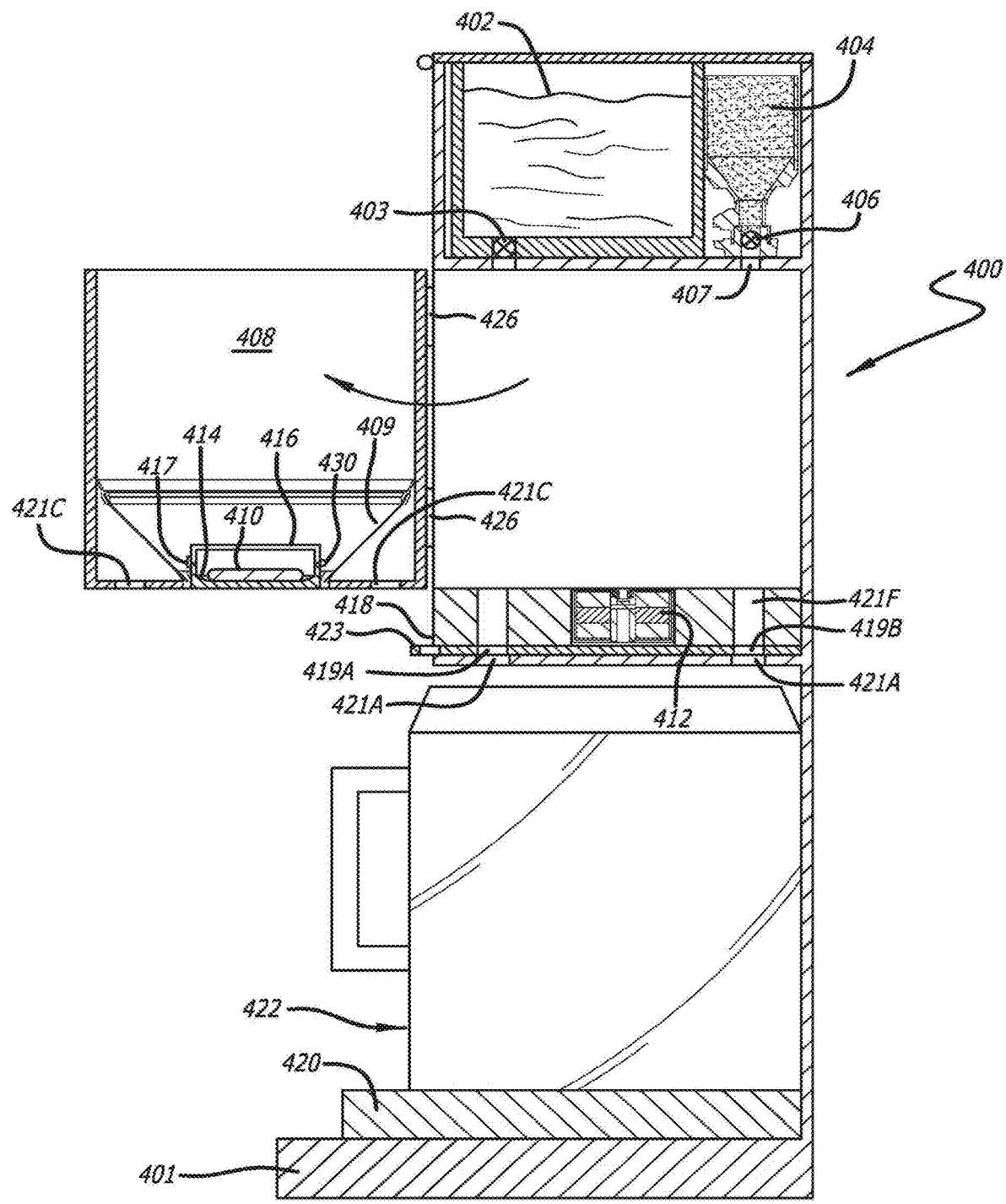
FIG. 18 illustrates a side sectional view of the home version of the present invention in which the brew vessel and filter compartment are open.

FIGS. 18-23 show a home version of the present invention. FIG. 18 shows a brew vessel 408; a coffee storage chamber 422 consisting of a standard glass coffee carafe; a water heating chamber 402; a coffee bean grinder 404; and a carafe heating plate 420. A portion of the walls of the brew vessel may be transparent for viewing of the brewing of the coffee. There is an outlet 403 in the water heating chamber 402 and an outlet 407 in the coffee bean grinder 404 that permits the water and the ground coffee beans to be deposited into the brew vessel 408. The brew vessel 408 contains the magnet stirrer 410, operated by a magnetic motor 412 in the base and a filter 409. A controller 500 controls the heating of the water, the grinding of the coffee beans, and valves 406 and 403 for depositing of the water and ground coffee into the brew vessel 408, as well as the amount of time the magnet stirrer 410 is on. A rotatable closure lid 418 is located beneath the brew vessel 408 and above a portion of the frame 401. The rotatable closure lid shown in FIGS. 21 and 22 has openings 419A and 419B so that when its first position the openings 419A and 419B are not in alignment with the openings 421A, 421B, 421C, 421D, 421E, and 421F thereby preventing any fluid from passing through the openings to the carafe 422. When the rotatable closure lid 418 is rotated, by movement of extending handle 423, the openings 419A and 419B align with openings 421A-421F permitting the coffee in the brew vessel 408 to pass into the carafe 422. The brew vessel 408 is held in place by cooperating pins 426 and 428 so that the brew vessel 408 containing the filter and magnet stirrer 410 are removable for cleaning.

Figure 19:
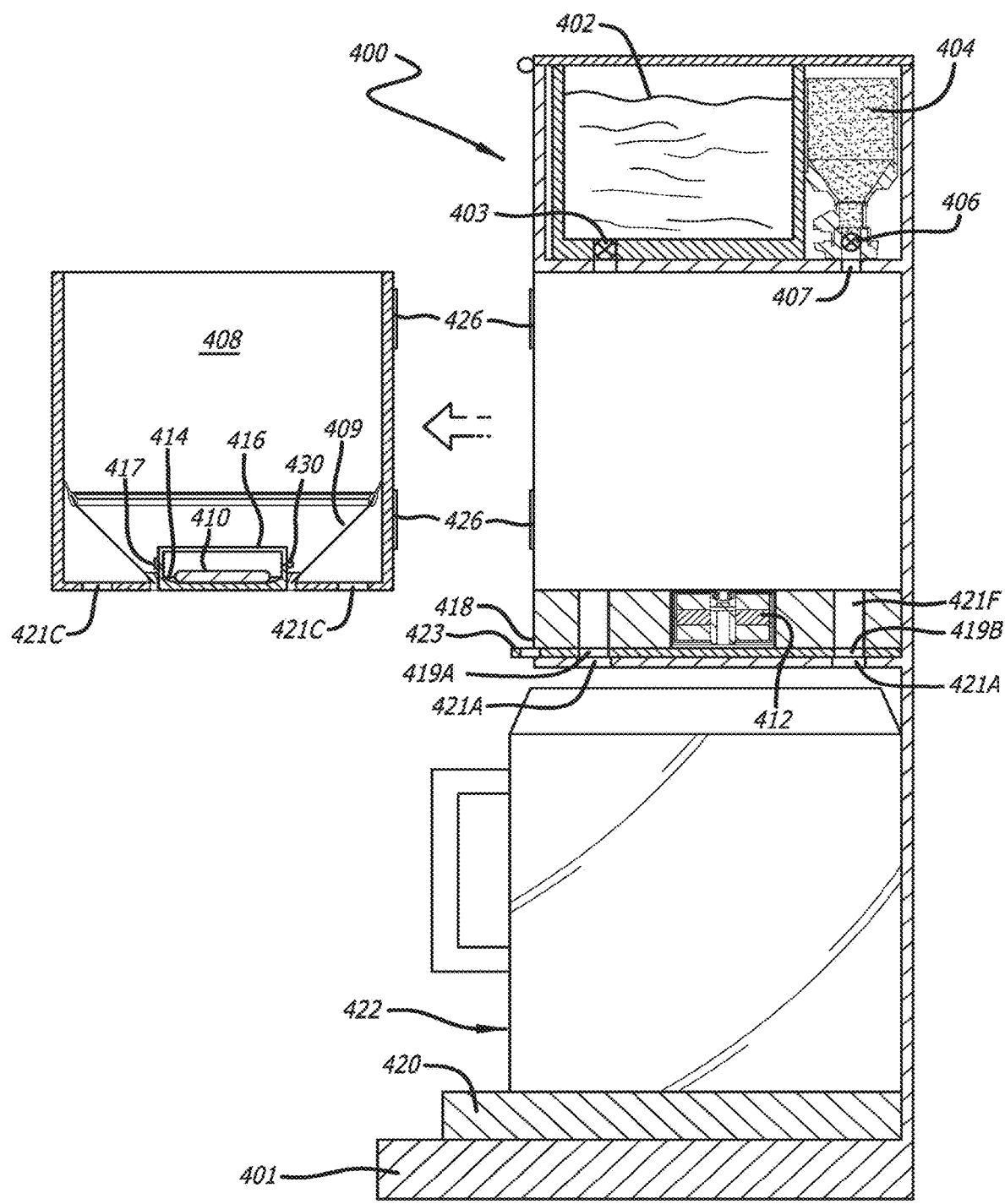
FIG. 19 illustrates a side sectional view of the home version of the present invention in which the brew vessel and filter compartment are separated.
Figure 20:
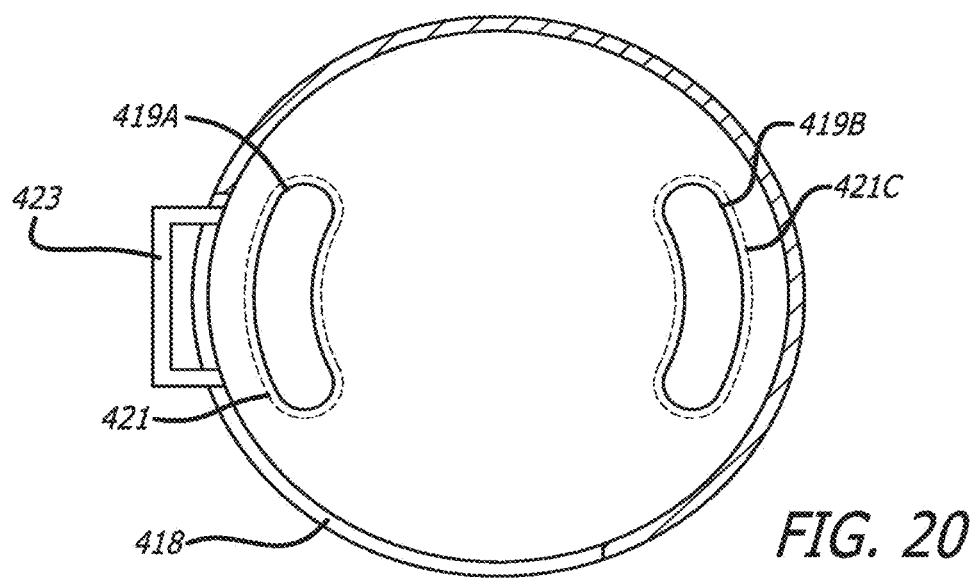
FIG. 20 illustrates the top view of the rotatable cover member in its closed position along lines 20-20 of FIG. 17 of the home version of the present invention.
Figure 21:
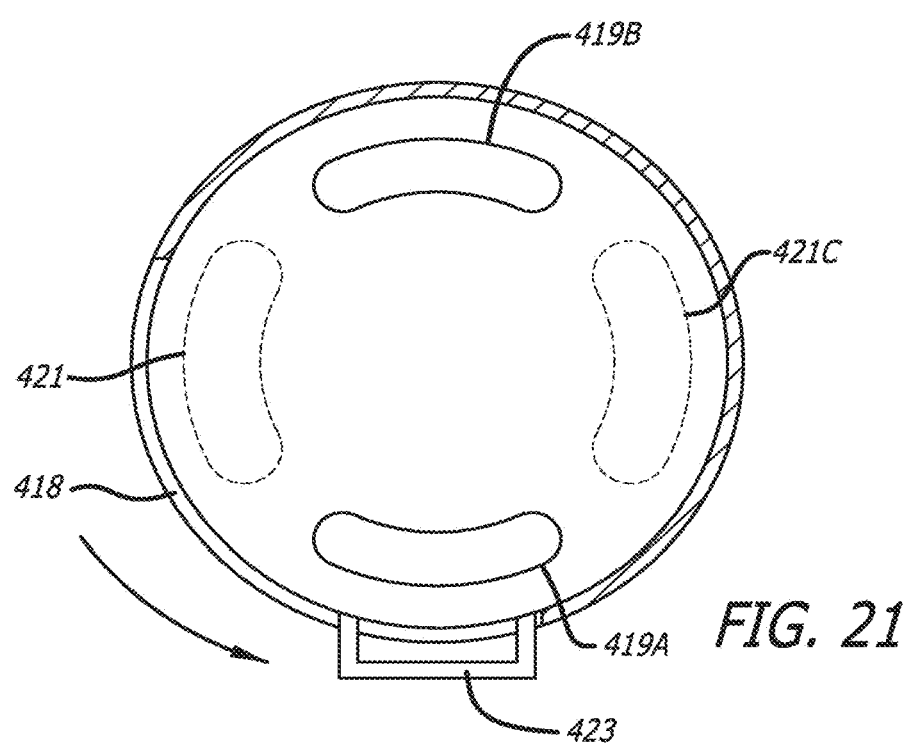
FIG. 21 illustrates the top view of the rotatable cover member in its open position along lines 20-20 of FIG. 17 of the home version of the present invention.
Figure 22:
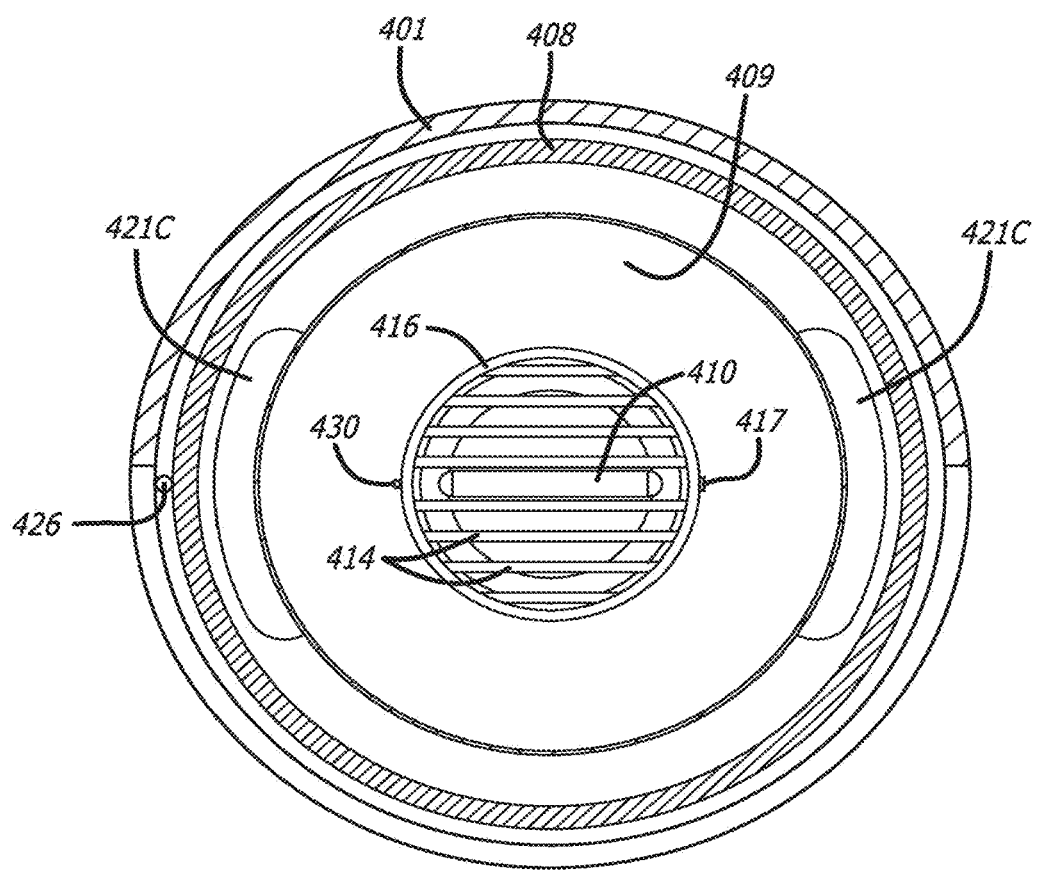
FIG. 22 illustrates a top sectional view of the rotatable cover member along lines 22-22 of FIG. 17.

Referring to FIGS. 19 and 22, a cover 416 for the magnet stirrer 410 is shown. The cover 416 consists of a series of thin wires 414. The top of the cover 416 being pivotable along one end 417 and a clasp 430 at the other end to open the top of the cover 416 and access the magnet stirrer 410. The cover 416 limits dislodgement of the magnet stirrer 410 during brewing and also prevents loss of the magnet stirrer 410 during cleaning of the magnet stirrer 410 and filter 409.

The operation of the home version of the present invention is essentially the same as the industrial version described above, after the coffee is in the carafe 422, the heating plate 420 keeps the coffee hot. As with the industrial version, the home version can be used to make cold brew coffee, the controller 500 controls the amount of time that the magnet stirrer 422 operates.

Another series of embodiments may further integrate a cleaning system within a brewing system to provide an efficient and visually pleasing coffee-making system. A coffee making system may include a coffee brewing system comprising a brew vessel mounted on a base with a coffee grinder assembly housing for grinding coffee beans received from a coffee bean holder The coffee vessel may be made of transparent or translucent material (glass or plastic).

The coffee grinder may be a standard coffee grinder with controls for selecting the degree of fineness of the ground coffee. A first hollow tubular member has an upwardly angled side opening for receipt of the ground coffee. A conventional coffee grinder is positioned above the side opening of the hollow member with the output of the grinder directly connected to the side opening of the hollow tubular member. An impeller fan is located proximate the top of the first hollow tubular member.

An air channel outside of the brewing chamber has an air inlet with access to the impeller fan intake. The air that the fan circulates is air that may be heated by the base of the coffee making machine to a level beyond the ambient temperature. This heated air is carried through a first tubular member and then then introduced through a second hollow tubular member into the space within the coffee brewing chamber above the water. Having heated air within the second hollow tubular member may prevent condensation forming on the walls of the brewing chamber, which may occur if cold or cooler air was introduced into the brewing chamber.

The air from the fan may be directed into the opening of a hollow channel as part of a second tubular member. The bottom opening of this second tubular member is located inside the brewing chamber with the bottom opening proximate the top of the water level. As the coffee beans are ground, the ground coffee is directed into an opening of this second hollow tubular member. The downward flow of air from the impeller fan assists the ground coffee downwardly through the second hollow tubular member and into the brewing chamber, which may be proximate to the center of the brewing chamber. The hot air flow needs to create a downward air flow stronger than the upward air from the rising steam. A major advantage of having the fan blow the air downward through the chute is to prevent the steam from the hot coffee going into the fan and the coffee grinder, which would corrode both. The fan should be "on" at all times during the coffee brewing/cleaning process, not just when coffee grounds are going through the chute.

In one embodiment the bottom of the second tubular member is above the level of water in the brewing vessel. The ground coffee is then circulated in the vortex created in the brewing vessel by the magnetic stirrer.

Due to the hot water producing steam vapor in the coffee brewing chamber, the air and steam vapor above the water rises into the second hollow tubular member. Absent the presence of the fan, the ground coffee falling through the hollow tubular member would be moistened. And since there are oils in the ground coffee, the ground coffee may stick to the inside of the hollow tubular member. This would impede the flow of the ground coffee and the inside of the tube would require more frequent cleaning. The system of tubular members described above may be called an "air flow chamber".

Figure 23A:
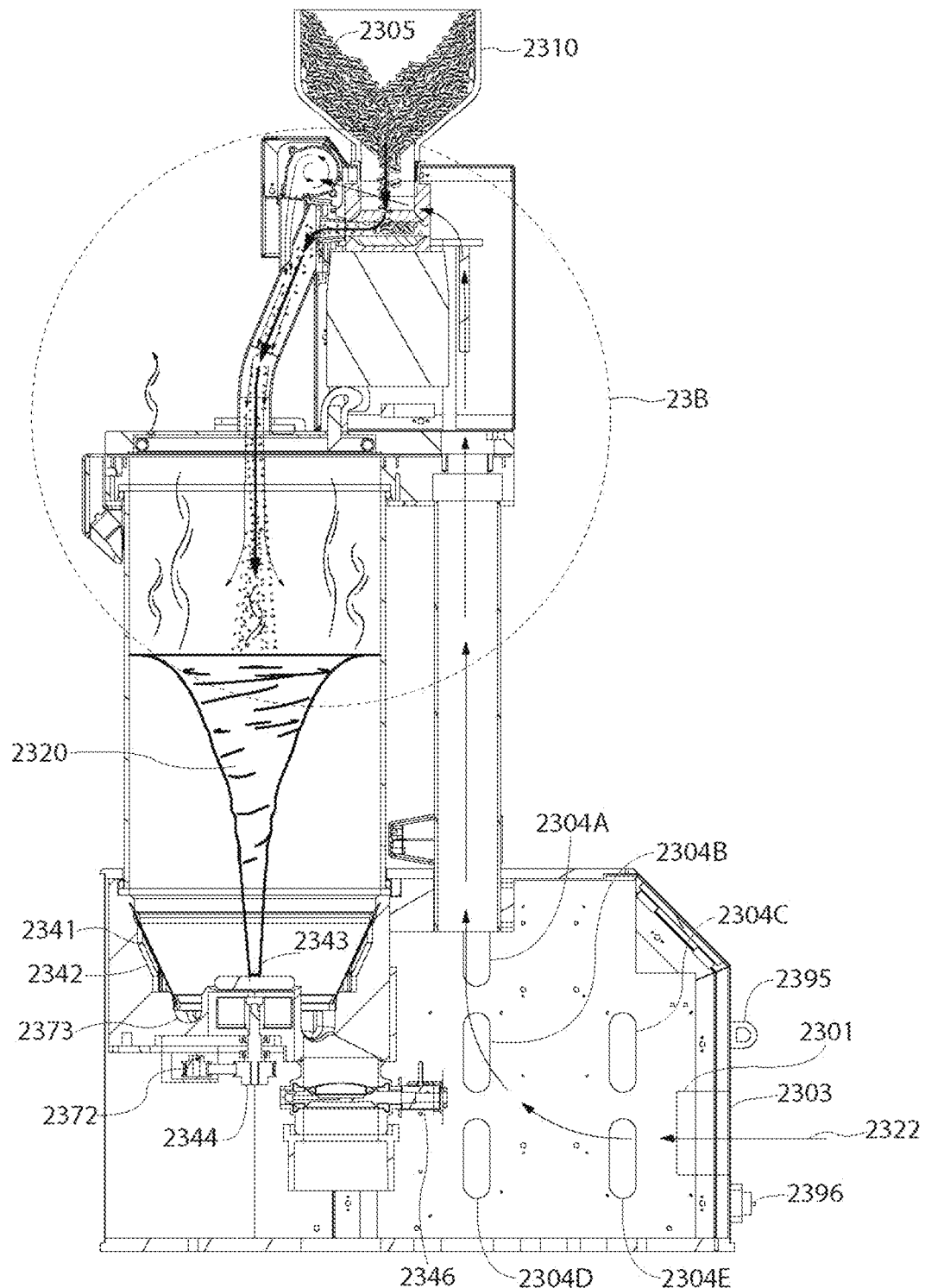
FIG. 23A illustrates an alternative embodiment of the magnetically driven beverage brewing system in accordance with an aspect of the present disclosure.
Figure 23B:
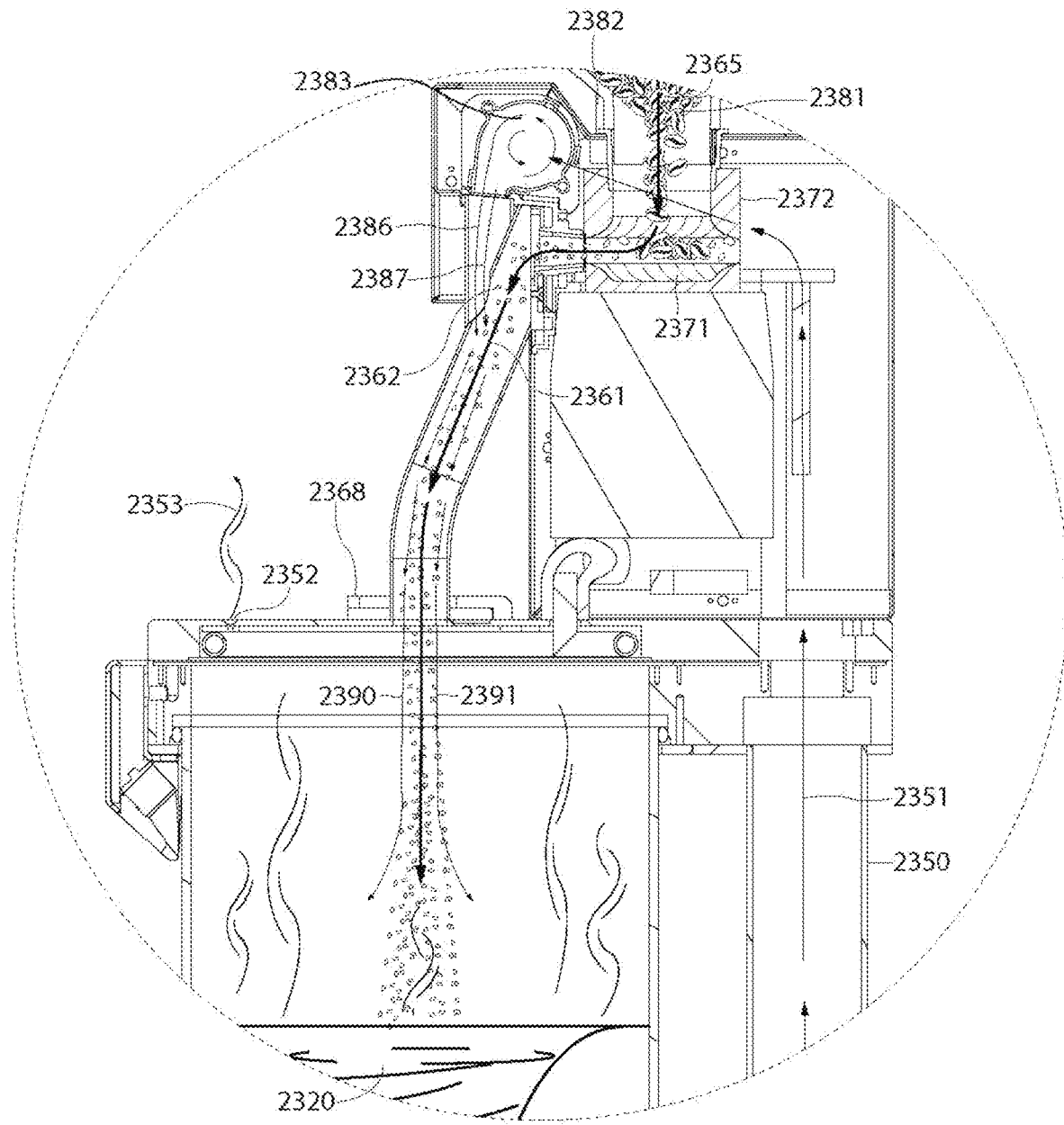
FIG. 23B illustrates a detail view of a portion of FIG. 23A.

Turning to FIG. 23A, shown is an alternative embodiment of the magnetically driven beverage brewing system in accordance with an aspect of the present disclosure. FIG. 23B illustrates a detail view of a portion of FIG. 23A. The system shows a hopper 2310 with coffee beans 2305 that may be unground. Also shown are an extraction outlet 2396 where the brewed coffee is extracted. Also shown is a soap-tablet locking/opening mechanism 2395 (discussed further below).

Upon commencement of the brewing cycle, the coffee beans 2381 fall 2365 into the space in between the upper burr grinder 2372 and the lower burr grinder 2371 to be ground into coffee grounds 2362. These coffee grounds 2362 ultimately fall 2361 into the vortex 2320 for brewing. The coffee grounds 2362 may instead descend into the vortex 2320 after having been ground in a separate process outside this device.

As part of the brewing process, air is drawn 2322 into the system 2303 possibly via a fan 2301. The air may flow over a series of heating elements 2340A, 2340B, 2340C, 2340D, 2340E. These heating elements 2340A, 2340B, 2340C, 2340D, 2340E may throw off additional heat resulting from the energy necessary provide quick heating to the water that is involved in the brewing process within the vortex 2320. The air flows upward 2351 through a chute 2350 and through the device to a fan 2383. The fan then forces the air downward 2386 2387 and into the brewing chamber 2390 2391.

The high temperature of the water during the vortex brewing process produces steam in the brewing chamber 2368 that exits through the aperture 2352 to produce steam outside the chamber 2353. The steam outside the chamber 2353 has the added benefit of producing a rich coffee aroma that attracts customer interest.

The vortex 2320 is driven via a magnetic stirrer 2343 driven by stirring mechanisms 2372 that turns about a rotating axis 2344. The butterfly valve 2346 may operate as discussed above.

The brewing process results in the coffee grounds settling in a gradient fashion on a mesh fabric support (which may be nylon) 2341 2342 into a bed 2373. The bed may cover the entire extraction outlet 2396. The coffee travels through these coffee grounds and mesh fabric support prior to being extracted from the extraction outlet 2396 through piping not shown.

Figure 23C:
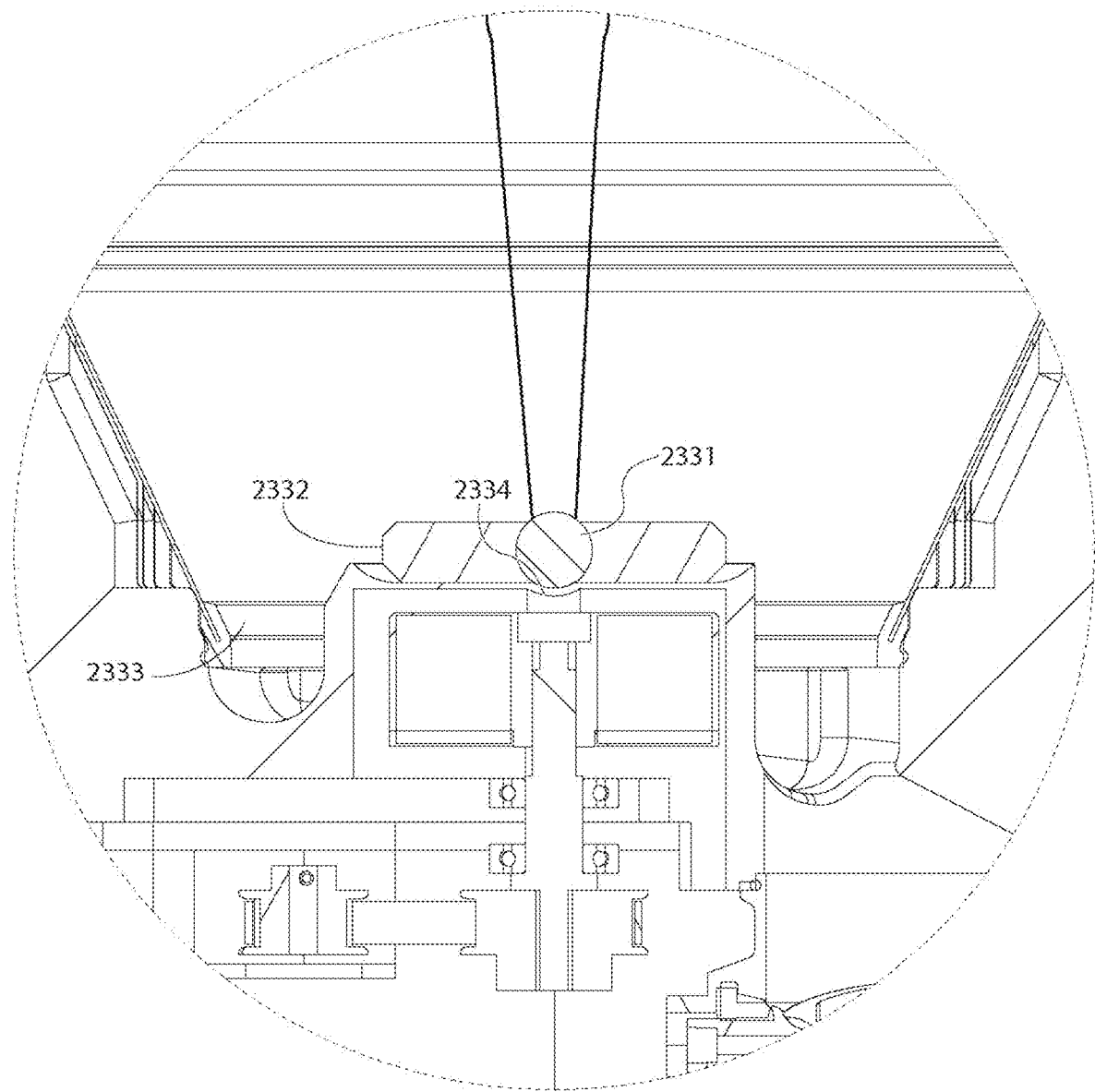
FIG. 23C shows a schematic of an alternative magnetic stirrer system.

FIG. 23C shows a schematic of an alternative magnetic stirrer system. Here the magnetic stirrer 2332 above the base 2333 is secured to a ball bearing 2331. The base 2333 includes a dimple 2334 to accommodate the shape of the ball bearing 2331. Using a ball bearing provides numerous advantages, including larger operating range temperature ranges and increased motor performance due to less motor friction.

Figure 24:
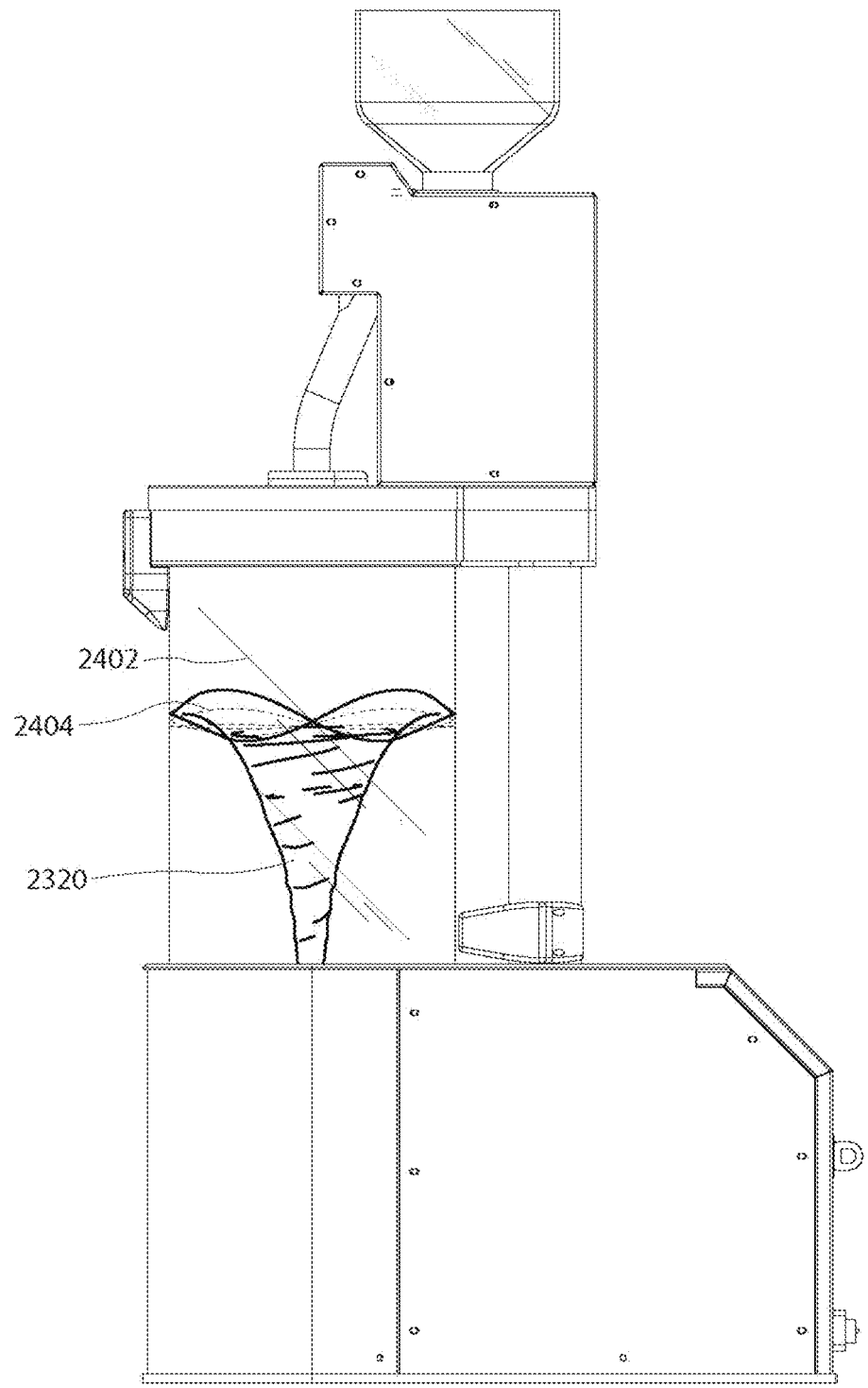
FIG. 24 illustrates a perspective view of an alternative embodiment of a magnetically driven vortex-producing beverage brewing system in accordance with an aspect of the present disclosure.

FIG. 24 illustrates a perspective view of an alternative embodiment of a magnetically driven vortex-producing beverage brewing system in accordance with an aspect of the present disclosure. Specifically, FIG. 24 shows the vortex 2320 can have an oscillating top 2404, which provides a unique visual element. Increasing the RPM of the stirring mechanisms (not shown) will cause the vortex 2320 to rise, and decreasing the RPM of the stirring mechanisms will cause the vortex 2320 to fall. This can be changed on a periodic basis in part to provide an attractive visual effect.

There may be significant challenges in cleaning the glass result from the steam emanating from the air/water interface and agitation of the coffee slurry, and the vortex before and after the unused coffee grounds are dropped in. This can fog up the glass and produce condensation. Further, static electricity makes oil and unused coffee grounds to stick to glass.

The vortex oscillation may also add to the challenge of cleaning the glass chamber 2402. This is because a coffee/coffee ground/coffee oil residue may be left as a film of varied consistency on the glass. Since the visual aspect of the brewing cycle is part of the attraction of this invention, this coffee residue needs to be carefully cleaned before the next brewing cycle begins.

Figure 25:
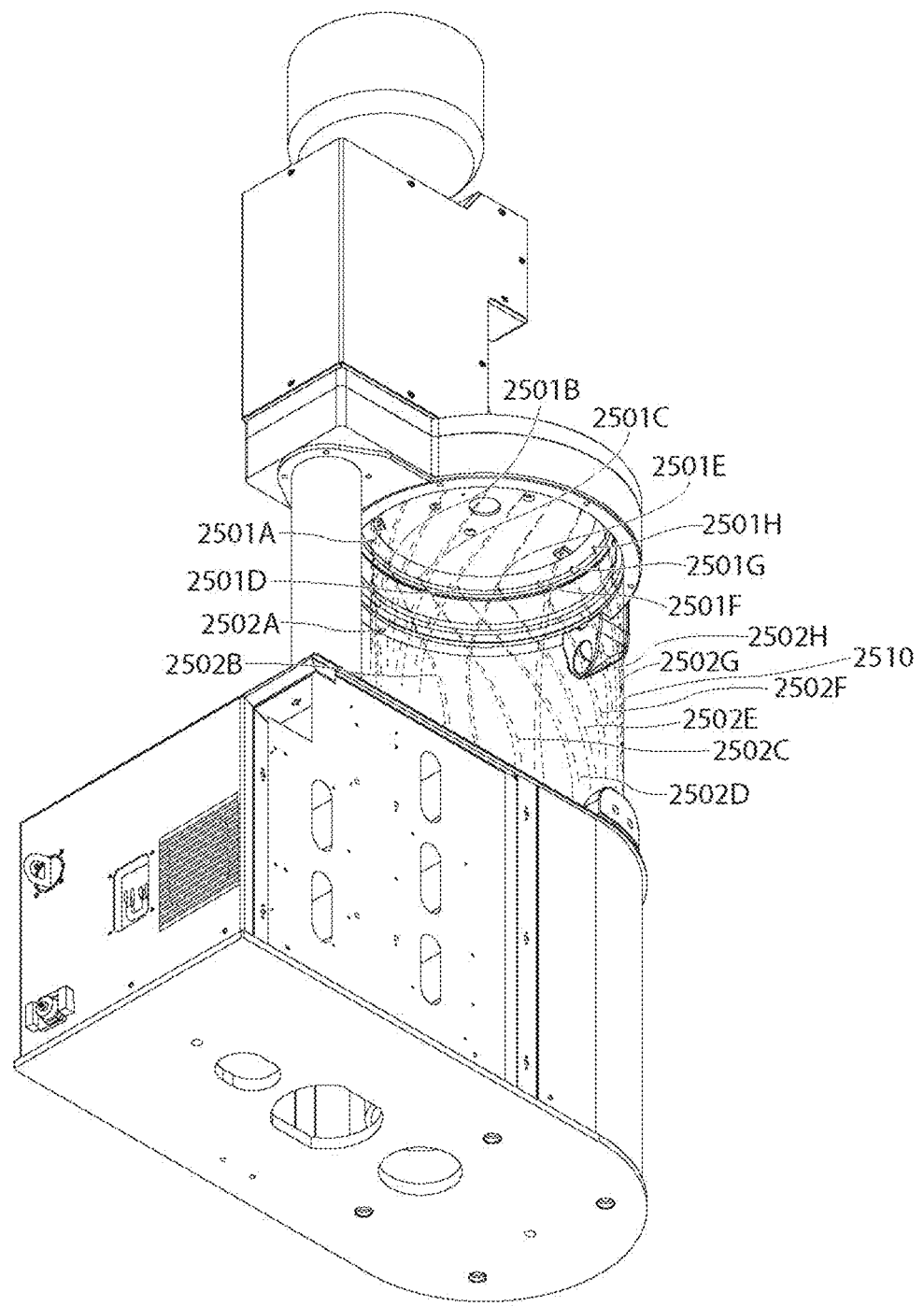
FIG. 25 illustrates a perspective view of an alternative embodiment of a magnetically driven vortex-producing beverage cleaning system in accordance with an aspect of the present disclosure.

FIG. 25 illustrates a perspective view of an alternative embodiment of a magnetically driven vortex-producing beverage cleaning system in accordance with an aspect of the present disclosure. Shown here is a cleaning system for a glass chamber 2510. Cleaning solutions are issued from apertures 2501A, 2501B, 2501C, 2501D, 2501E, 2501F, 2501G, 2501H that may produce cleaning fluid streams 2502A, 2502B, 2502C, 2502D, 2502E, 2502F, 2502G, 2502H. The cleaning fluid streams are designed to clean the glass in a crisscross manner so that all parts of the glass may be cleaned multiple times from multiple angles. This provides a superior cleaning process that is also visually pleasing.

Figure 26:
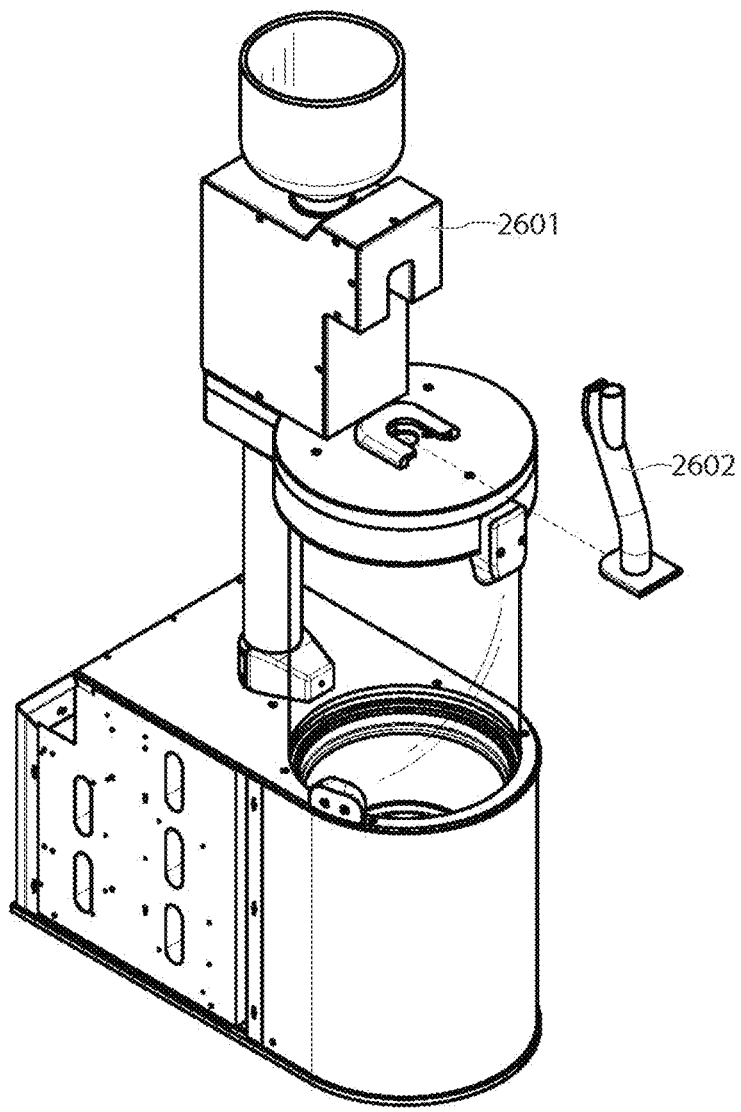
FIG. 26 illustrates a perspective view of an alternative embodiment of a magnetically driven vortex-producing beverage brewing system with a removable chute in accordance with an aspect of the present disclosure.

FIG. 26 illustrates a perspective view of an alternative embodiment of a magnetically driven vortex-producing beverage brewing system with a removable chute in accordance with an aspect of the present disclosure. Here, the chute 2602 may be selectively removed and replaced into the receptacle 2601. This allows the chute 2602 to be cleaned separately as part of the cleaning cycle of the overall system.

Figure 27A:
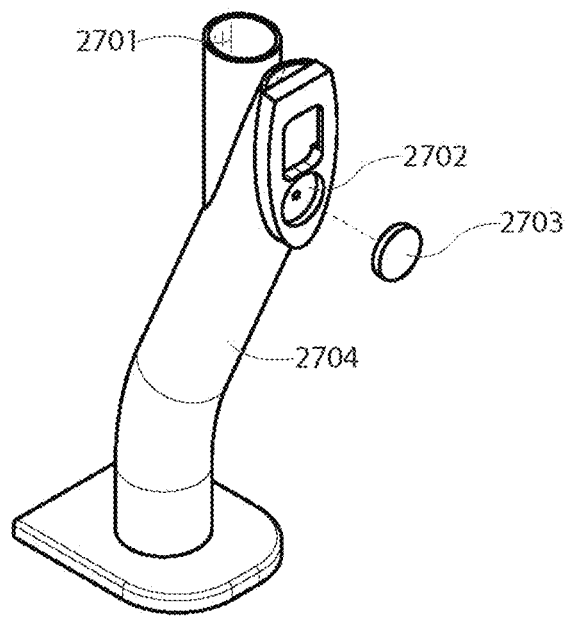
FIG. 27A and FIG. 27B are perspective views of the removable chute in FIG. 26.
Figure 27B:
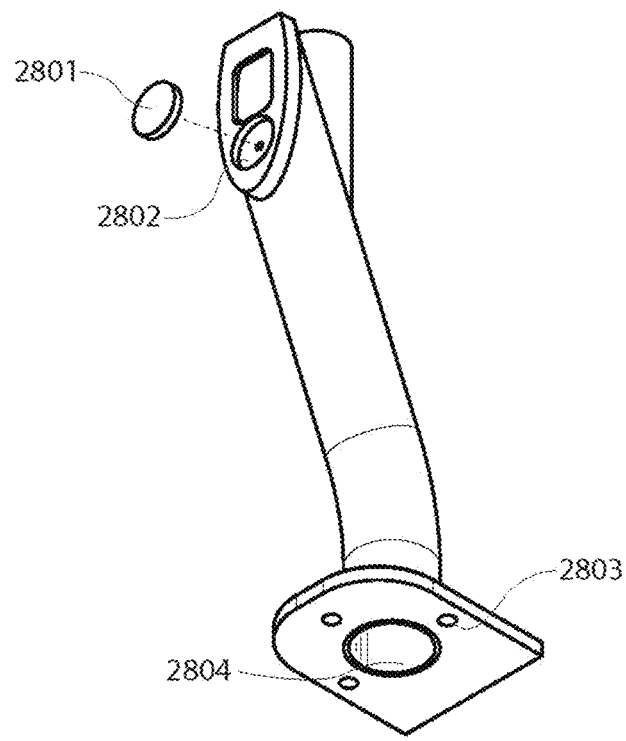

FIG. 27A and FIG. 27B are perspective views of the removable chute in FIG. 26. Here, the chute 2704, 2804 includes an aperture 2701 and a selectively insertable and removeable member 2703, 2801 in a receptacle 2702, 2802. The removable chute may be secured to the rest of the system via securing mechanisms 2803. Further, removable members 2703 and 2801 may be magnetic, although any attachment mechanism may be used for cleaning access to chutes 2704 2804.

Figures 28A, 28B:
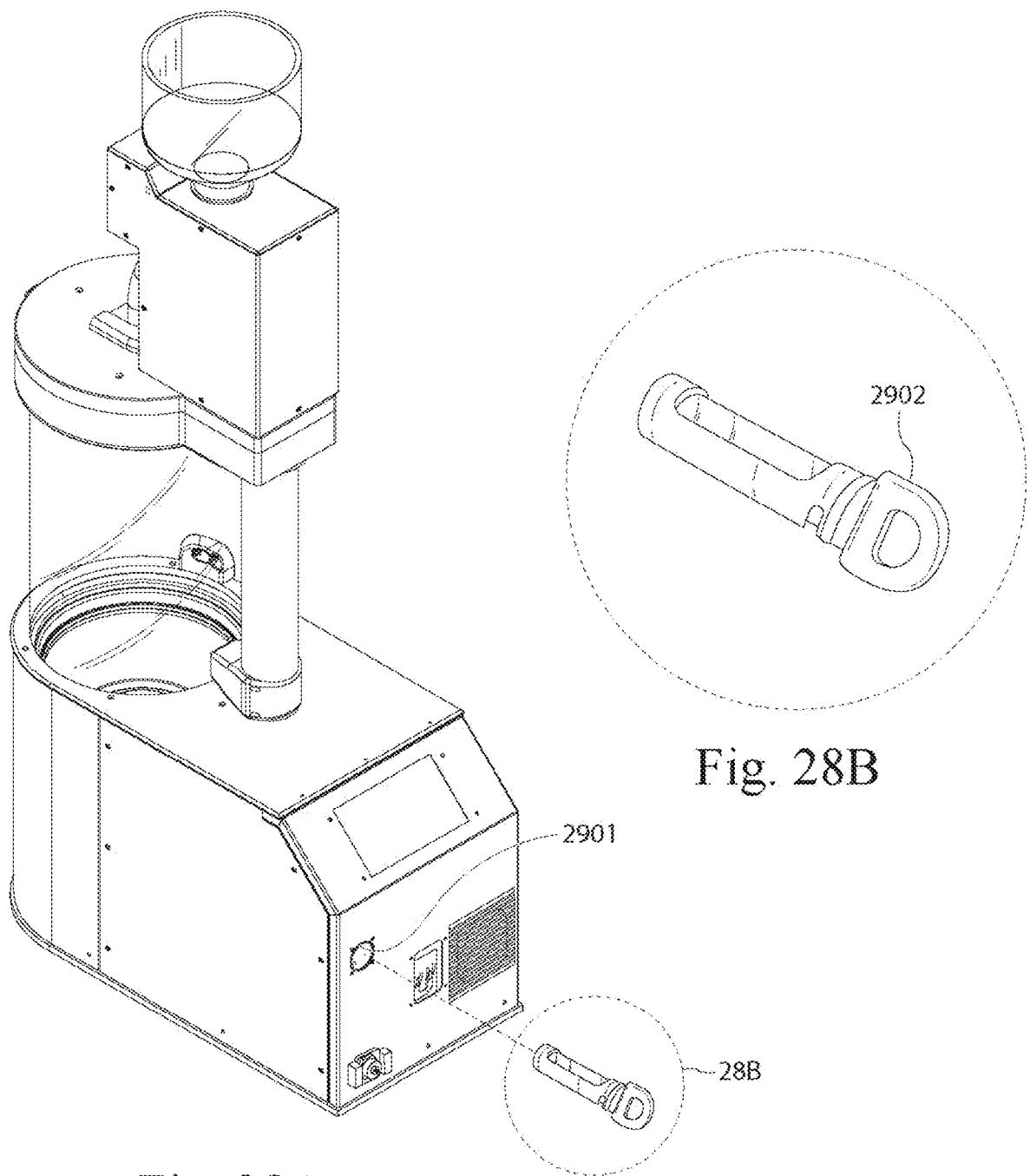
FIG. 28A illustrates a perspective view of an alternative embodiment of a magnetically driven vortex-producing beverage cleaning system with an insertable soap key in accordance with an aspect of the present disclosure.
FIG. 28B illustrates a detail view of a portion of FIG. 28A.

FIG. 28A illustrates a perspective view of an alternative embodiment of a magnetically driven vortex-producing beverage cleaning system with an insertable soap key in accordance with an aspect of the present disclosure. FIG. 28B illustrates a detail view of a portion of FIG. 28A. Here, the soap key 2902 may be selectively inserted and removed from cleaning receptacle 2901.

FIG. 29A illustrates a perspective view of an alternative embodiment of a magnetically driven vortex-producing beverage cleaning system with an insertable soap key having soap tablets in accordance with an aspect of the present disclosure. FIG. 29B illustrates a detail view of a portion of FIG. 29A. Again, the soap key 2902 may be selectively inserted and removed from cleaning receptacle 2901. The soap key 2902 may have selectively insertable and removable soap tablets 2901A, 2901B, 2901C, 2901D, 2901E, 2901F.

Figure 29C:
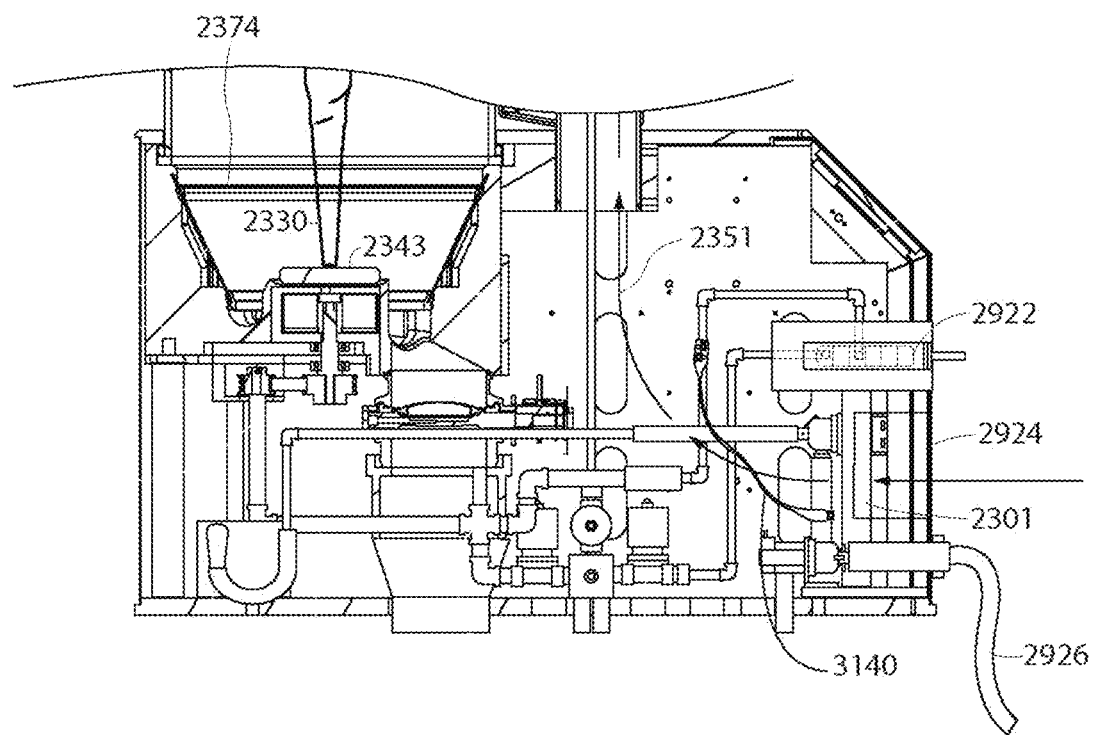
FIG. 29C illustrates an internal view of FIG. 29A.

FIG. 29C illustrates an internal view of FIG. 29A in the cleaning cycle. The soap key 2922 has been inserted into the device and the device is now in cleaning mode. As part of the cleaning process, air is drawn 2351 into the system 2924 optionally via a fan 2301.

The cleaning operation may begin by filling the brew chamber from the bottom for cleaning. Specifically, the soap cleaning occurs by putting in the soap key, generating a filling cycle for soapy water, which may stop slightly above the nylon fabric filter 2374. The cleaning cycle then turns on magnetic stirrer 2343 causing a cleaning vortex 2330. The cleaning process cleans the interior brewing apparatus including the glass, the filter 2374, and other mechanisms. To conclude the cycle, the butterfly valve is opened allowing the coffee slurry and the soapy water to fall out. The cleaning system from above may then activated (as shown in FIG. 25, for example), which further cleans the glass with hot water. This process may be repeated several times, and may include rinse water (water without soap).

The soap key 2922 includes soap tablets and is installed between a solenoid for hot water (described below) and the brewing chamber. By this installation placement for a cleaning cycle, the hot water flows through the soap key 2922, dissolves the soap tablets, and cleans the brewing system. By the time the cycle is done, there is no residual soap from the tablets remaining.

Also shown is the flexible member 3140 (discussed below) and a coffee drawing tube 2926.

Figure 30:
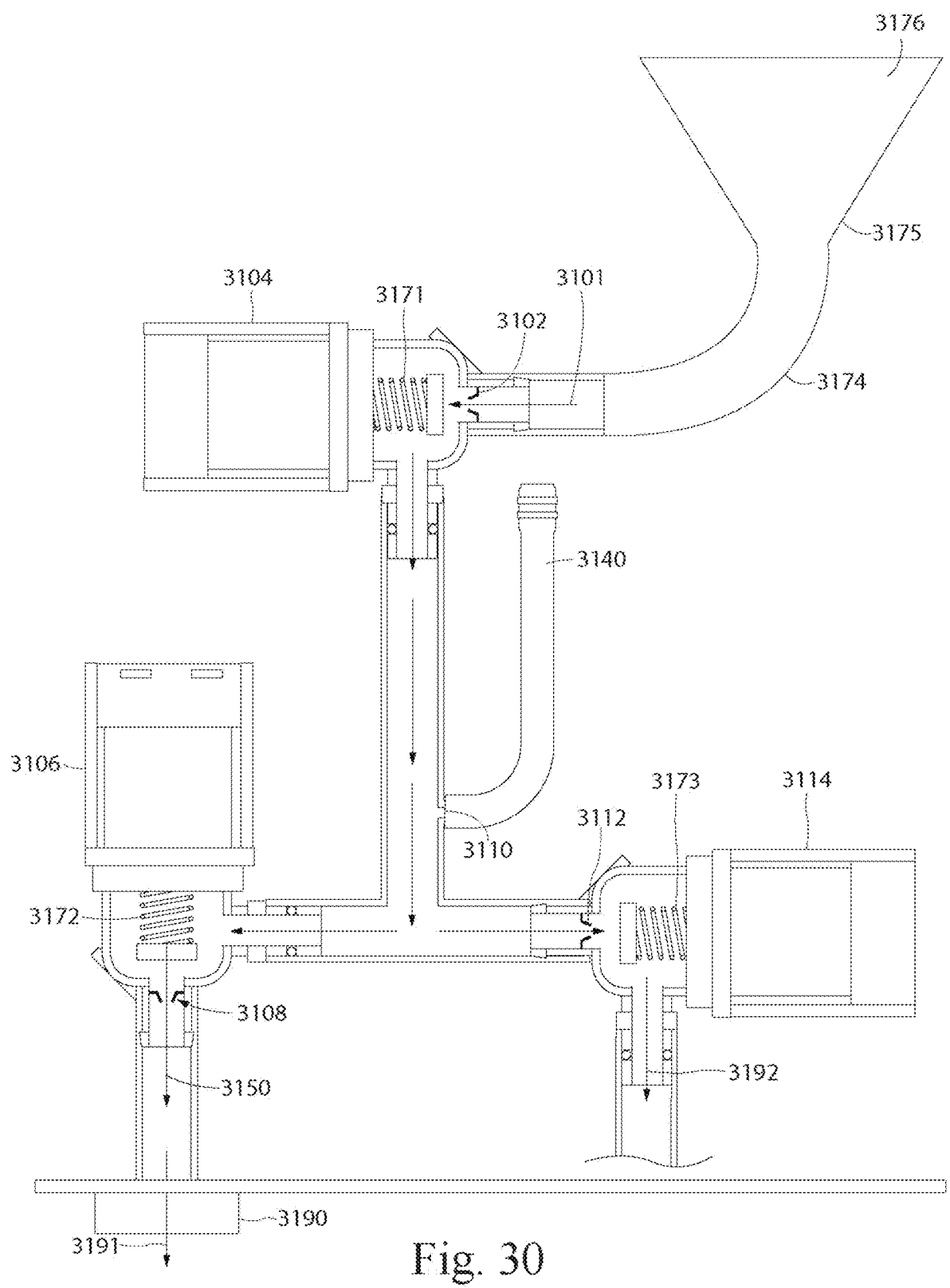
FIG. 30 illustrates a schematic of solenoid valves in accordance with an aspect of the present disclosure.

FIG. 30 illustrates a schematic of solenoid valves in accordance with an aspect of the present disclosure. Here, a first solenoid 3104 controls a first valve 3102 for the first liquid flow 3101.

The first liquid flow 3101 is in fluid communication with a tubing 3174 leading to a container 3176 where the (usually hot) brewed coffee sits ready to be drawn. A sensor 3175 may inform the system as to the presence and volume of the brewed coffee. The first spring 3171 holds the first solenoid 3104 closed until the first solenoid current is activated and opens the first solenoid 3104. This allows the brewed coffee to flow to the second solenoid 3106 and/or third solenoid 3114. In general, this system is then designed to allow: (a) selective withdrawal of the brewed (usually hot) coffee via an open second solenoid 3106 (while keeping the third solenoid 3114 closed); or (b) selective withdrawal of (often cooler) waste coffee, unused grounds, and the like via an open third solenoid 3114 (which keeping the second solenoid 3106 closed).

Specifically, a second solenoid 3106 controls a second valve 3108 for the second liquid flow 3150. The second spring 3172 holds the second solenoid 3106 closed until the second solenoid current is activated and opens the second solenoid 3106. This allows the brewed coffee to flow to the quick release valve 3190 operated by a person withdrawing the brewed coffee. Then, when that quick release valve 3190 is open, the hot coffee flows 3191 for collection and providing to the customer.

A third solenoid 3114 controls a third valve 3112 for the third liquid flow 3155. The third spring 3173 holds the third solenoid 3114 closed until the third solenoid current is activated and opens the third solenoid 3114. This allows the waste coffee, along with the used coffee grounds and the like to flow 3192 to the waste receptable.

The flow of the liquids controlled by the solenoid valves (e.g., hot water, cold water, hot coffee) may be improved by installation of a flexible member 3140 with an aperture 3110. The flexible member 3140 can provide a mechanism for an uptake of excess liquid through the system of solenoids to prevent backflows and allow for better flow of liquid through the system. Such backflows may occur because of the expansion of hot water and contraction of cold water that occurs during the cycles described herein.

Specifically, when the hot coffee or water cools in this solenoid system, it may create a vacuum-related pressure that pins third solenoid 3114 closed and pulls the second solenoid 3106 open. Even though the second solenoid 3106 is pinned open, the cooling coffee does not exit the system because the closed quick disconnect valve 3190 prevents discharge. Nonetheless, the condensing, cooling liquid creates vacuum-related pressure that prevents this waste liquid from being extracted via the third solenoid 3114 through the desired flow 3192 to a waste receptacle.

Adding the accumulator 3140 with an aperture 3110 solves this problem. The accumulator 3140 should be made a rubber or other flexible material. When the condensing, cooling liquid creates a vacuum effect described above, the accumulator 3140 partially collapses. This reduces the vacuum pressure effect so that the third solenoid 3114 can open and the second solenoid 3106 can open.

Alternatively, if there is a need to brew a larger amount of coffee in a container 3176, then the increased hydrostatic pressure of the coffee will exert a higher pressure on the three solenoids 3104, 3106, 3114. To efficiently extract coffee under this increased hydrostatic pressure situation, the operator can open the first solenoid 3104, open the second solenoid 3106, and the selectively open and close third solenoid 3114 for a short time duration. This both relieves the increased hydrostatic pressure and allows for efficient brewed coffee extraction from the second solenoid 3106. Since the opening of the third solenoid 3114 occurs for limited times, there is a limited amount of coffee wasted from going to the waste disposal 3192.

Figure 31:
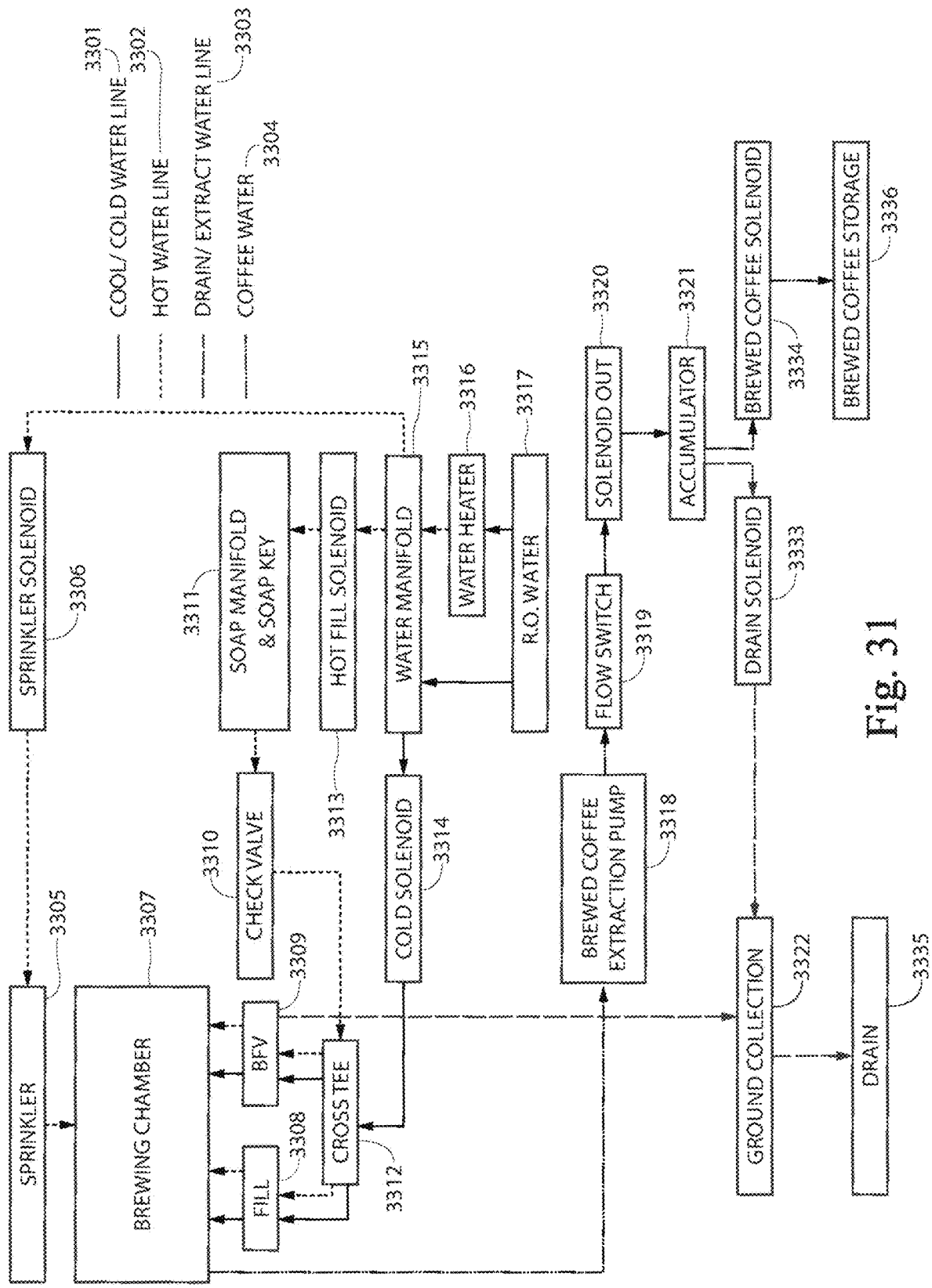
FIG. 31 is a flowchart of operation of an alternative embodiment of the magnetically driven beverage brewing system in accordance with an aspect of the present disclosure.

FIG. 31 is a flowchart of operation of an alternative embodiment of the magnetically driven beverage brewing system in accordance with an aspect of the present disclosure. The flowchart shows operations of 4 separate systems: (a) cool/cold water flows (shown in solid lines) 3301; (b) hot water flows (shown in dotted lines) 3302; (c) drain/extract water flows (shown in dashed lines) 3303: and (d) coffee water flows (shown in dotted-dashed lines) 3304.

The cool/cold water flow 3301 begins with R.O. [reverse osmosis] water 3317 and moves to the water heater 3316 and (in parallel) the water manifold 3315. From the water manifold 3315, the cold water flows through the cold solenoid 3314 to the cross tee 3312 and then (in parallel) to the fill 3308 and BFV [butterfly valve] 3309 and on to the brewing chamber 3307. (The water manifold may be at least partially within a cleaning receptacle for guiding soap water and/or clean rinse water.)

The hot water flow 3302 begins with the water manifold 3315 and proceeds through the sprinkler solenoid 3306 to the sprinkler 3305 and into the brewing chamber 3307. For a cleaning cycle, hot water also flows from the water manifold 3315 through the hot fill solenoid 3313, through the soap manifold and soap key 3311, through the check valve 3310 and to the cross tee 3312. From the cross tee 3312 the now soapy hot water processed (in parallel) to the fill 3308 and BFV 3309 and on to the brewing chamber 3307.

The drain/extract water flow 3303 begins both at the BFV 3309 to the ground collection 3322 and the accumulator 3321 through the drain solenoid 3333 to the ground collection 3322. The extract then continues from the ground collection 3322 to the drain 3335.

The coffee water flow 3304 begins with brewing chamber 3307 via a brewed coffee extraction pump 3318 through a flow switch 3319 and through a solenoid out 3320 to the accumulator 3321. From there, the coffee water flows through the brewed coffee solenoid 3334 to the brewed coffee storage 3336.

Although the present disclosure and its advantages have been described in detail, it should be understood that various changes, substitutions and alterations can be made herein without departing from the technology of the disclosure as defined by the appended claims. For example, relational terms, such as "above" and "below" are used with respect to components. Of course, if the component is inverted, above becomes below, and vice versa. Additionally, if oriented sideways, above and below may refer to sides of a component. Moreover, the scope of the present application is not intended to be limited to the particular configurations of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

It should be understood that when an element is referred to as being "connected" or "coupled" to another element (or variations thereof), it can be directly connected or coupled to the other element or intervening elements may be present. In contrast, when an element is referred to as being "directly connected" or "directly coupled" to another element (or variations thereof), there are no intervening elements present.

Benefits, other advantages, and solutions to problems have been described herein with regard to specific embodiments. However, the benefits, advantages, solutions to problems, and elements that may cause any benefit, advantage, or solution to occur or become more pronounced are not to be construed as critical, required, or essential features or elements of the disclosure. It should be appreciated that in the appended claims, reference to an element in the singular is not intended to mean "one and only one" unless explicitly so stated, but rather "one or more."

The description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein. The following goes at the end of the current detailed description of the invention Although several embodiments have been described in detail for purposes of illustration, various modifications may be made without departing from the scope and spirit of the present disclosure. Accordingly, the disclosure is not to be limited by the examples presented herein, but is envisioned as encompassing the scope described in the appended claims and the full range of equivalents of the appended claims.

I claim:

1. A system comprising:
a coffee brewing chamber;
a coffee chute associated with the coffee brewing chamber having coffee grounds;
a water manifold for guiding heated water into the coffee brewing chamber;
an air flow chamber for guiding moving air into the coffee brewing chamber;
a magnetic stirrer within the coffee brewing chamber rotating about a stirrer axis;
wherein the moving air guides the coffee grounds from the coffee chute into the coffee brewing chamber;
wherein activation of the magnetic stirrer creates a brewing vortex rotating about the stirrer axis that brews the heated water and the coffee grounds into brewed coffee;
wherein the coffee brewing chamber has a transparent portion;
wherein the water manifold guides a portion of the heated water from a plurality of nozzles installed within the top of the coffee brewing chamber.

2. The system as in claim 1, wherein the coffee grounds comprise a set of second coffee grounds that settle at a bottom of the coffee brewing chamber upon deactivation of the coffee brewing chamber.

3. The system as in claim 2, wherein the set of second coffee grounds have an increasing gradient of size.

4. The system as in claim 3, wherein the brewed coffee is withdrawn from the coffee brewing chamber through the set of second coffee grounds.

5. The system as in claim 3, wherein the set of second coffee grounds acts as a filter for the brewed coffee.

6. The system as in claim 1, wherein release of the portion of the heated water occurs radially.

7. The system as in claim 6, wherein the portion of the heated water cleans the transparent portion.

8. The system as in claim 1, wherein the activation and deactivation of the magnetic stirrer uses a modulation pattern.

9. The system as in claim 1, wherein the air flow chamber draws the moving air over heated elements to heat the moving air.

10. The system as in claim 9, wherein the air flow chamber further comprises a fan to force the moving air into the coffee brewing chamber.

11. The system as in claim 1, wherein increasing and decreasing speed of the magnetic stirrer produces the brewing vortex of varying height.

12. A system comprising:
   a coffee brewing chamber;
   a coffee chute associated with the coffee brewing chamber having coffee grounds;
   a water manifold for guiding heated water into the coffee brewing chamber;
   an air flow chamber for guiding moving air into the coffee brewing chamber;
   a magnetic stirrer within the coffee brewing chamber rotating about a stirrer axis;
   wherein the moving air guides the coffee grounds from the coffee chute into the coffee brewing chamber;
   a flexible accumulator for uptake of excess liquid,
   wherein activation of the magnetic stirrer creates a brewing vortex rotating about the stirrer axis that brews the heated water and the coffee grounds into brewed coffee;
   wherein the coffee brewing chamber has a transparent portion.

13. A system comprising:
   a coffee brewing chamber;
   a coffee chute associated with the coffee brewing chamber having coffee grounds;
   a water manifold for guiding heated water into the coffee brewing chamber;
   an air flow chamber for guiding moving air into the coffee brewing chamber;
   a magnetic stirrer within the coffee brewing chamber rotating about a stirrer axis;
   wherein the moving air guides the coffee grounds from the coffee chute into the coffee brewing chamber;
   wherein activation of the magnetic stirrer creates a brewing vortex rotating about the stirrer axis that brews the heated water and the coffee grounds into brewed coffee;
   wherein the coffee grounds comprise a set of second coffee grounds that settle at a bottom of the coffee brewing chamber upon deactivation of the coffee brewing chamber;
   a mesh fabric upon which the set of second coffee grounds settle;
   wherein the coffee brewing chamber has a transparent portion.

* * * * *